(12) United States Patent
Mita et al.

(10) Patent No.: US 6,710,551 B2
(45) Date of Patent: Mar. 23, 2004

(54) HIGH-INTENSITY DISCHARGE LAMP LIGHTING APPARATUS AND LUMINAIRE FOR USING THE SAME

(75) Inventors: Kazutoshi Mita, Kanagawa-ken (JP); Hideo Kozuka, Kanagawa-ken (JP)

(73) Assignee: Toshiba Lighting & Technology Corporation, Tokyo (JP)

(*) Notice: Subject to any disclaimer, the term of this patent is extended or adjusted under 35 U.S.C. 154(b) by 40 days.

(21) Appl. No.: 10/085,106

(22) Filed: Mar. 1, 2002

(65) Prior Publication Data

US 2002/0121867 A1 Sep. 5, 2002

(30) Foreign Application Priority Data

Mar. 2, 2001 (JP) .................................. P2001-059278
Dec. 25, 2001 (JP) .................................. P2001-392786

(51) Int. Cl.[7] .............................................. H05B 37/02
(52) U.S. Cl. ................................. 315/209 R; 315/225
(58) Field of Search ................................. 315/224, 225, 315/209 R, 244, 291, 219, 307, 308

(56) References Cited

U.S. PATENT DOCUMENTS

| | | | | |
|---|---|---|---|---|
| 4,471,268 A | * | 9/1984 | Brown et al. | 315/178 |
| 5,491,386 A | | 2/1996 | Eriguchi et al. | 315/209 R |
| 5,869,935 A | * | 2/1999 | Sodhi | 315/225 |
| 5,883,473 A | * | 3/1999 | Li et al. | 315/225 |
| 6,437,515 B1 | * | 8/2002 | Kamoi et al. | 315/209 R |

FOREIGN PATENT DOCUMENTS

| | | |
|---|---|---|
| JP | 7-230884 | 8/1995 |
| JP | 2000-286086 | 10/2000 |

* cited by examiner

Primary Examiner—Wilson Lee
(74) Attorney, Agent, or Firm—Pillsbury Winthrop LLP

(57) ABSTRACT

A high-intensity discharge lamp lighting apparatus, including a main circuit, which contains an LC oscillation circuit, and to which a high-intensity discharge lamp is coupled, and an electronic ballast for starting up into a lighting state the high-intensity discharge lamp via the main circuit which is coupled to its output side, and it is operated at a resonance frequency of the LC resonance circuit in the main circuit at a no-load time.

23 Claims, 16 Drawing Sheets

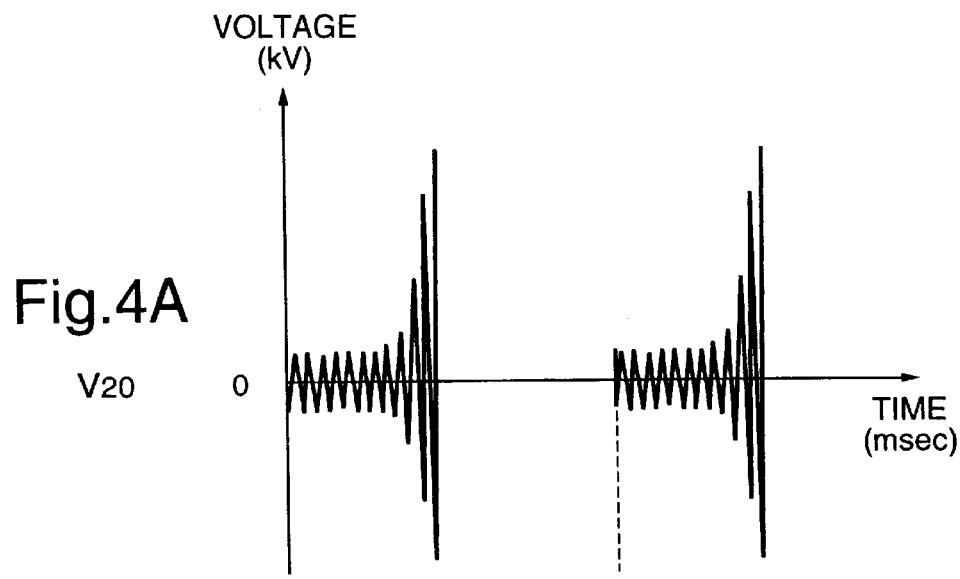
Fig.4A $V_{20}$
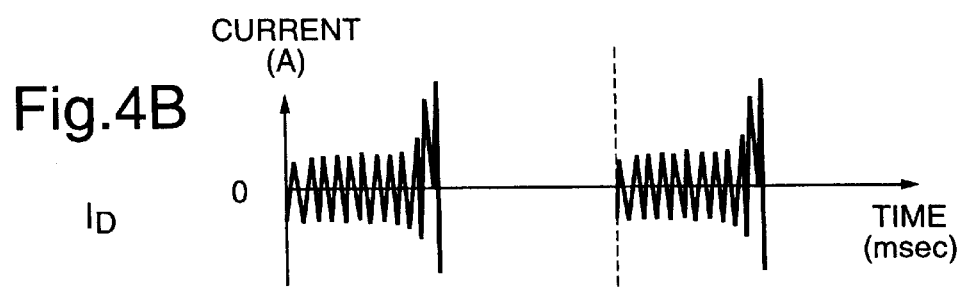
Fig.4B $I_D$
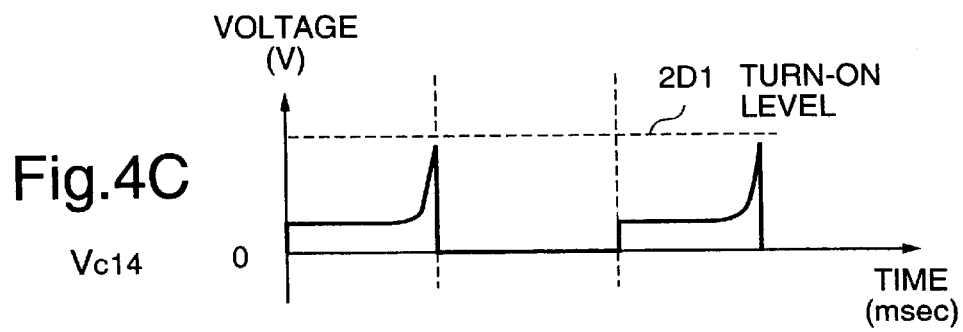
Fig.4C $V_{c14}$
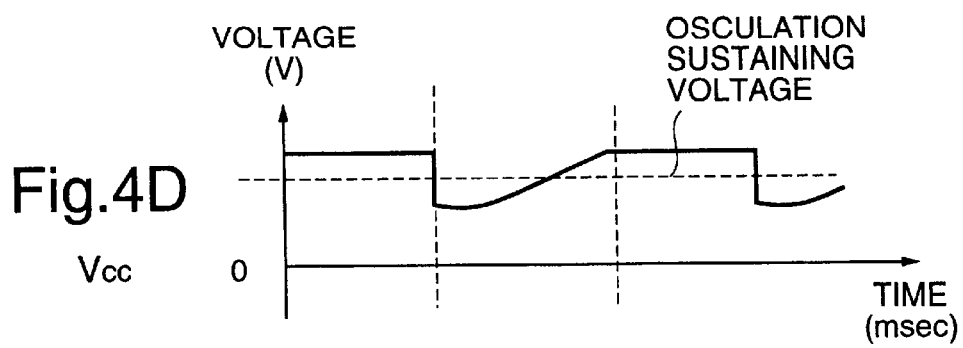
Fig.4D $V_{cc}$

HIGH-INTENSITY DISCHARGE LAMP LIGHTING APPARATUS AND LUMINAIRE FOR USING THE SAME

FIELD OF THE INVENTION

The present invention relates to a high-intensity discharge lamp lighting apparatus for stably lighting a high-intensity discharge lamp and to a luminaire for using the same.

BACKGROUND OF THE INVENTION

Conventionally, such a discharge lamp lighting apparatus is disclosed in the JP 62-241295.

The discharge lamp lighting apparatus disclosed in the JP62-241295 is provided with an LC resonance type electronic ballast for preheating filaments in discharge lamps.

The electronic ballast makes its frequency to continuously lower in beginning with a frequency higher than an LC resonance frequency. When the frequency becomes close to the LC resonance frequency, the lamps having filaments are started up into a lighting state. When the electronic ballast starts an oscillation at such a high frequency, the filaments are preheated by a low secondary voltage enough to avoid a start-up of the discharge lamp. As the electronic ballast frequency gradually lowers and becomes close to the LC resonance frequency, the secondary voltage is boosted. When the secondary voltage reaches a predetermined voltage, the discharge lamp is started up. After a discharge lamp has lighted up, the electronic ballast frequency lowers below the LC resonance frequency. Then the discharge lamp is maintained in lighting state.

However, the discharge lamp lighting apparatus disclosed in the JP62-241295 has drawbacks of complicated operation and control for varying the secondary voltage by continuously varying the frequency. In a low pressure discharge lamp such as a fluorescent lamp, the discharge lamp is started up into a lighting state when the secondary voltage becomes a high voltage for a very short period even shorter than a second. However, in a high-intensity discharge lamp, especially using a neon (Ne) and an argon (Ar), the secondary voltage must be maintained for a relatively long period, i.e., one to two seconds for the glow-arc transition. However, in the conventional discharge lamp, it was unable to maintain the high voltage comparatively for a long time. So that, it was difficult to start to light the high intensity discharge lamp certainly.

On the other hand, the electronic ballast needs a frequency of 20 kHz or more that is the upper limit of an audible frequency range in order to prevent flickering. Moreover, it is common to set the electronic ballast frequency to 100 kHz or less in order to make measures against the flickering easy. However, in the band of 20 kHz to 100 kHz, which is used relatively often for the electronic ballast frequency, there exist dispersively several frequency bands wherein the high intensity discharge lamp might causes acoustic resonance. Thus, a frequency around the central region of the stable operation window, that is a frequency band free from acoustic resonance, among areas where the acoustic resonance might occur on the high-intensity discharge lamp, is used for the electronic ballast resonance frequency.

However, since the frequency band of this stable operation window is very narrow, when the electronic ballast frequency is being fixed, several frequency bands of acoustic resonance of the high intensity discharge lamps overlap the fixed electronic ballast frequency according to variations in products, so as to cause the drawback of acoustic resonance, i.e., flickering. In such a case, it is difficult to determine in which end of the fixed electronic ballast frequency band the acoustic resonance occurs. That is, it is difficult to determine whether the acoustic resonance occurs in the upper end of a lower frequency band or in the lower end of a higher frequency band. Therefore, it is difficult to deal with the acoustic resonance.

To solve such problems, it is considered to choose the electronic ballast frequency in a sufficiently high frequency band or in a sufficiently low frequency band which is free from acoustic resonance.

However, in such a high frequency, there is a drawback that the switching loss of the electronic ballast becomes large.

Further, for obtaining such a low frequency, the inductance of an LC resonance circuit has to be made larger. As a result, there is a drawback of upsizing a coil constituting the LC resonance circuit.

As described above, in the discharge lamp lighting apparatus disclosed in the JP62-241295, the control of varying the secondary voltage in the operation of continuously varying the electronic ballast frequency becomes complicated.

Moreover, in the case of a high intensity discharge lamp, it is required to maintain a high no-load voltage for 1 or 2 seconds for causing the glow-arc transition. However, it is difficult to continuously vary the frequency while fulfilling such conditions. Thus it is also difficult to maintain the open circuit voltage for a sufficient time.

Furthermore, if it is tried to use the central frequency in a stable operation window of a very narrow frequency band within the frequency band of 20 kHz to 100 kHz that is used very often as an electronic ballast oscillation frequency, an actual oscillation frequency deviates from the stable operation window. Accordingly, since it is unclear whether the oscillation frequency is higher or lower than the stable operation window even when the lamp power varies extensively, or the acoustic resonance occurs, it is difficult to deal with these problems. When the electronic ballast oscillation frequency rises to a high frequency enough for avoiding acoustic resonance, there occurs a problem of increasing the switching loss. On the contrary, however when the electronic ballast oscillation frequency lowers to a low frequency enough for avoiding acoustic resonance, there occurs another problem of upsizing the apparatus.

SUMMARY OF THE INVENTION

The present invention was made in view of these problems, and it has an object to provide a high-intensity discharge lamp lighting apparatus for stably lighting a high-intensity discharge lamp and a luminaire for using the same.

In order to achieve the object described above, the high-intensity discharge lamp lighting apparatus according to the first embodiment of the present invention, comprising, a main circuit which contains an LC resonance circuit, and which is coupled to a high-intensity discharge lamp, an electronic ballast which starts and lights the high-intensity discharge lamp via the main circuit which is coupled to the output side of it, and which is operated with a resonance frequency of the LC resonance circuit in the main circuit in the no-load condition, and the electronic ballast, which is operated at the resonance frequency of the LC resonance circuit in the main circuit in the no-load condition, can increase a secondary open voltage through the glow discharge condition and maintain the high secondary voltage at the time of glow-arc transition.

The high-intensity discharge lamp lighting apparatus according to a second embodiment of the present invention, the LC resonance circuit is provided with inductors in addition. The inductors saturate at the start of the glow discharge of the high-intensity discharge lamp, and fail to saturate during the glow discharge and arc discharge operations. A high intensity discharge lamp starts the glow discharge operation in a short time by applied the high voltage since it requires the electrical breakdown before lighting, and it applies less stress to a circuit even under the condition that the inductors saturate. As it is necessary to radiate thermions in a glow-arc transition, it is able to avoid stresses being applied to the circuit if the circuit is maintained in a relatively high voltage for a period necessary for the glow-arc transition by avoiding saturation of inductors.

A high-intensity discharge lamp lighting apparatus according to a third embodiment of the present invention, wherein the operating frequency of the electronic ballast at the start of the glow discharge of the high-intensity discharge lamp matches the resonance frequency of the LC resonance circuit in the no-load condition under the state that the inductors saturate, and its frequency during the glow discharge of the high-intensity discharge lamp matches the no-load resonance frequency of the LC resonance circuit under that state that the inductors fail to saturate. So, it becomes easy to control the frequencies of the high-intensity discharge lamp at the start of the glow discharge time, during the glow discharge, and at the glow-arc transition time. Accordingly, even in the high intensity discharge lamp which requires a high voltage to maintain the glow discharge (a high intensity discharge lamp in which Ne is filled), it is able to maintain the glow discharge and improve the start-up performance. Here, the no-load resonance frequency during a glow discharge operation and at a glow-arc transition means an acoustic resonance frequency of the whole including the high intensity discharge lamp. Since the high-intensity discharge lamp during the glow discharge operation and at the glow-arc transition time is in a high impedance state, they are indicated as a no-load here.

A high-intensity discharge lamp lighting apparatus according to a fourth aspect of the present invention further comprises, a glow discharge detector for detecting the glow discharge of the high intensity discharge lamp, and an output reducer for reducing an output voltage within the range where the glow discharge is maintained at a frequency higher than the resonance frequency at the no-load state of the LC resonance circuit under the condition where the inductors are not saturate after detecting the glow discharge in the glow discharge detector, wherein after the detection of the glow discharge, the electronic ballast is effectively operated at a lagging phase and a frequency higher than the resonance frequency at the no-load state, while its output voltage lowers. Accordingly, it is able to reduce the voltage inputted to the high-intensity discharge lamp at the glow discharge time, and suppress a blackening of the lamp by suppressing sputtering of electrode materials in high-intensity discharge lamps.

A high-intensity discharge lamp lighting apparatus according to a fifth aspect of the present invention, wherein the operating frequency of the electronic ballast is set to be near the upper limit or the lower limit of the frequency band where the acoustic resonance occurs on the high-intensity discharge lamp. So, even when the acoustic resonance occurs on the high-intensity discharge lamp, it is easy to determine whether the lighting frequency is too high or too low. Thus, by controlling the lighting frequency to be shifted into either frequency band which is free from acoustic resonance, so as to avoid the acoustic resonance.

A high-intensity discharge lamp lighting apparatus according to a sixth aspect of the present invention, further comprising an acoustic resonance detector for detecting the acoustic resonance of the high-intensity discharge lamp. When the acoustic resonance is detected in the acoustic resonance detector, the operating frequency of the electronic ballast shifts into either frequency band which is free from acoustic resonance. As the acoustic resonance is reduced if the electronic ballast frequency shifts into either frequency band which is free from acoustic resonance, and is opposite to the frequency band close to the ordinary set-up frequency where the acoustic resonance might occur, the acoustic resonance is avoided by shifting the frequency to the other end of the frequency band which is free from acoustic resonance.

A high intensity discharge lamp lighting apparatus according to a seventh aspect of the present invention comprises a timer circuit in addition. When the glow discharge detector does not detect the glow discharge of the discharge lamp within a specific periods clocked with the timer circuit, the electronic ballast is reset to the state at the start of operation. When the discharge lamp fails the glow discharge, the operation is repeated from the state at the start of operation.

A luminaire according to an eighth aspect of the present invention comprises a high-intensity discharge lamp lighting apparatus of any embodiments described above, and a lighting equipment main body whereon the high-intensity discharge lamp to be lighted up in the high-intensity discharge lamp lighting apparatus is mounted.

Additional objects and advantages of the present invention will be apparent to persons skilled in the art from a study of the following description and the accompanying drawings, which are hereby incorporated in and constitute a part of this specification.

BRIEF DESCRIPTION OF THE DRAWINGS

A more complete appreciation of the present invention and many of the attendant advantages thereof will be readily obtained as the same becomes better understood by reference to the following detailed description when considered in connection with the accompanying drawings, wherein:

FIGS. 4A to 4D are waveform diagrams showing the secondary voltage, the drain current and the input voltage of the oscillation driver IC in the first embodiment of the high-intensity discharge lamp lighting apparatus according to the present invention;

DESCRIPTION OF THE PREFERRED EMBODIMENTS

The present invention will be described in detail with reference to the attached drawings, FIGS. 1 through 16.

Figure 1:
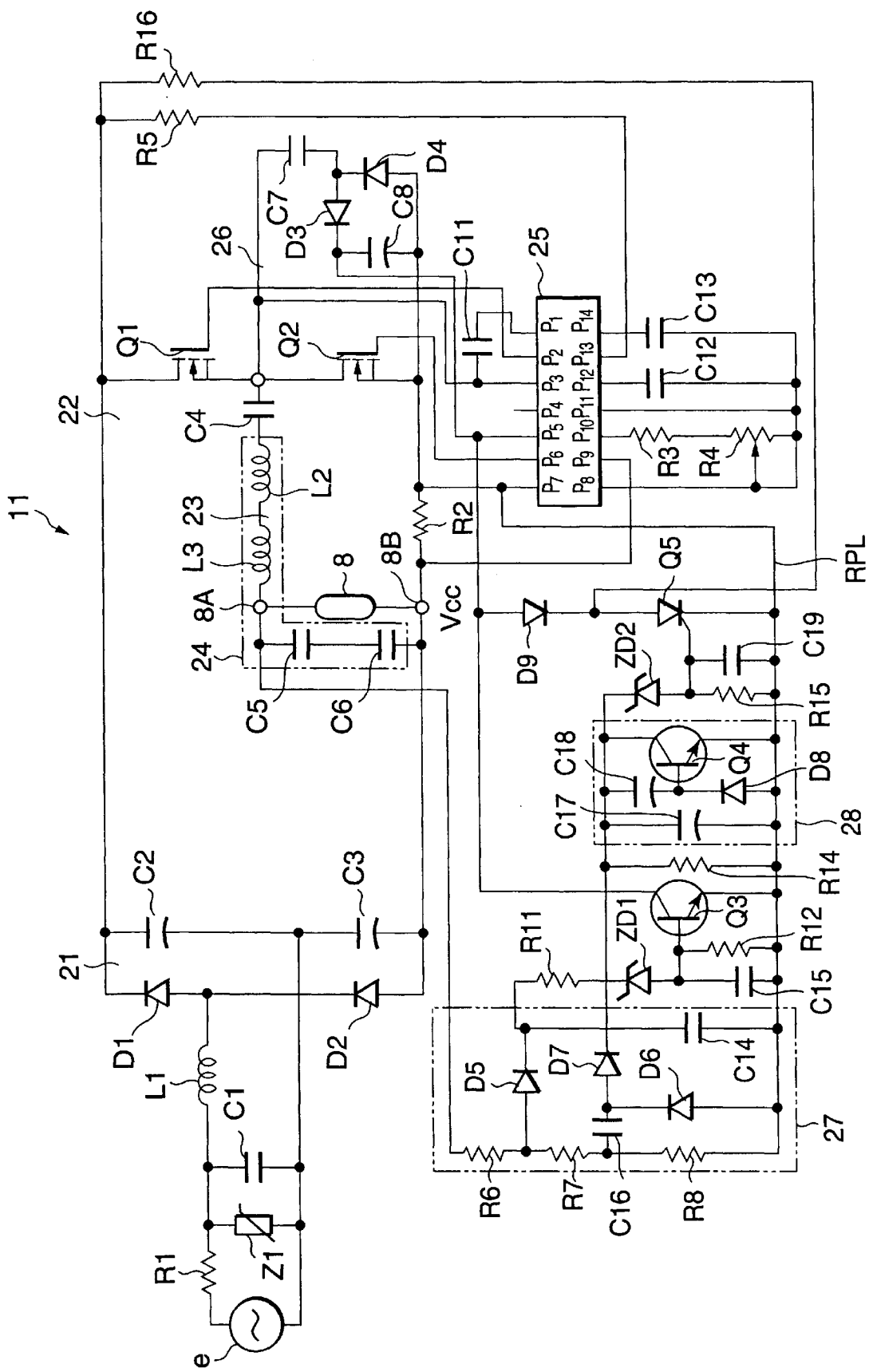
FIG. 1 is a circuit diagram showing the first embodiment of the high-intensity discharge lamp lighting apparatus according to the present invention.
Figure 2:
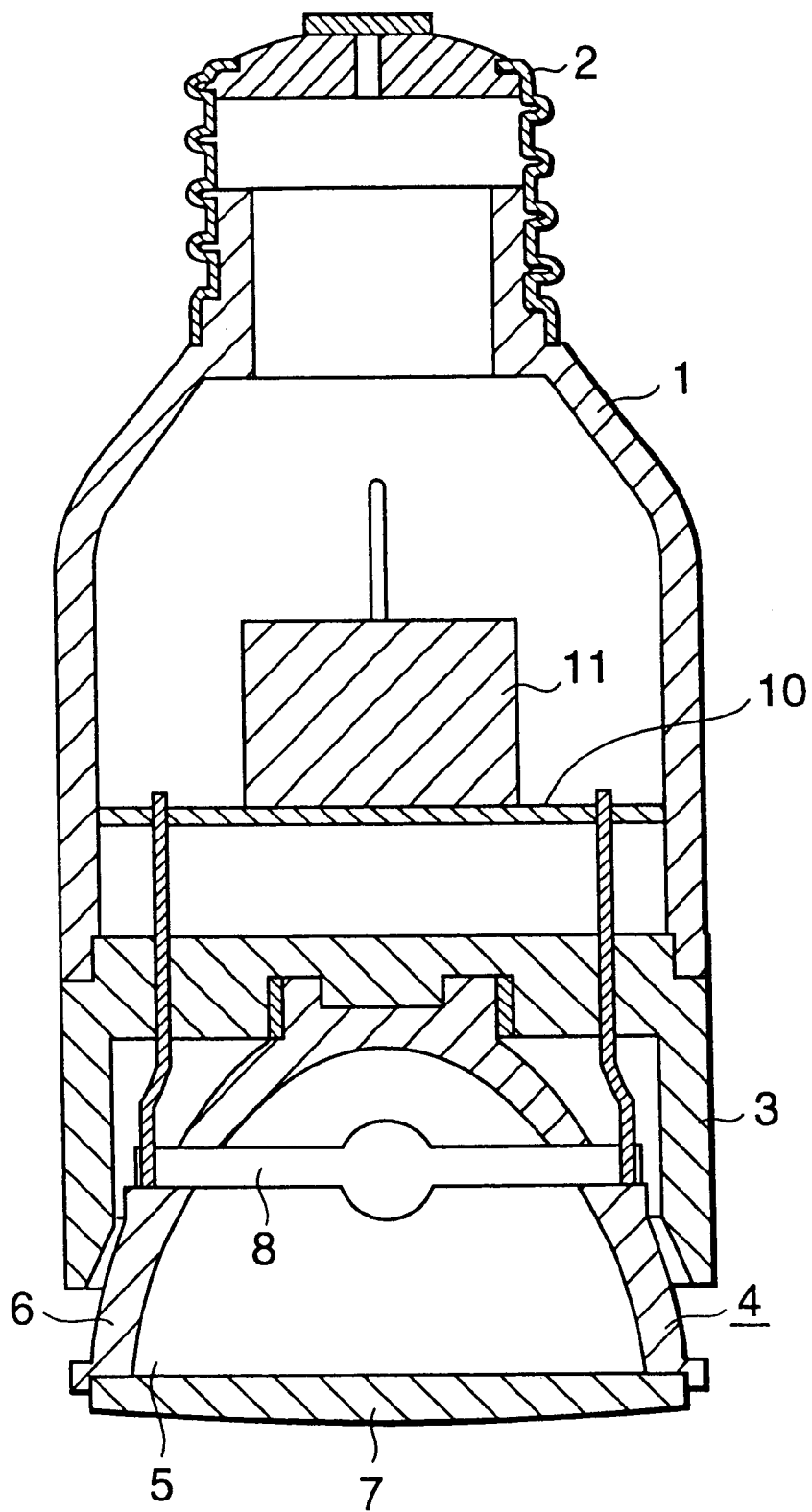
FIG. 2 is a sectional drawing showing the lighting system of the eighth embodiment according to the present invention.

FIG. 1 is a circuit diagram showing the first embodiment of the high-intensity discharge lamp lighting apparatus according to the present invention. FIG. 2 is a sectional view of the luminaire using therein the high-intensity discharge lamp lighting apparatus.

As shown in FIG. 2, the luminaire is provided with a cylindrical main body 1. A screw base 2 is secured on the basic end of the main body 1, and a light-projecting section 4 is fitted to a cylindrical protector 3 defined at the tip end of the main body 1. The light-projecting section 4 has a parabolic reflector 6 which is provided with a light projection opening 5. To the light projection opening 5 a translucent cover 7 is attached. A high-intensity discharge lamp (HID) 8 such as a ceramic metal halide lamp is mounted in the parabolic reflector 6 around its focal point.

A wiring board is settled inside the main body 1. The high-intensity discharge lamp lighting apparatus 11 for lighting the high-intensity discharge lamp 8 is constructed on the wiring board 10.

The high-intensity discharge lamp lighting apparatus 11 is coupled to a commercial AC power source e via an input circuit comprised of a resistor R1, an inductor L1, a constant-voltage device Z1 and a capacitor C1, as shown in FIG. 1. The input circuit is coupled to a double-voltage rectifier 21. The double-voltage rectifier 21 is comprised of a series circuit of diodes D1 and D2, and a series circuit of capacitors C2 and C3, and it is coupled to an electronic ballast 22.

The electronic ballast 22 is constructed in a half-bridge configuration wherein two field-effect transistors Q1 and Q2 performing switching operation are coupled in series with each other. To the field-effect transistor Q2 is coupled a main circuit 23 in parallel, in which a DC-blocking capacitor C4, two inductors L2 and L3 in series which become a ballast chalk, and two capacitors C5 and C6 in series which comprise an LC resonance circuit 24 with the inductors L2 and L3 are coupled in series, and it is coupled to the reference potential line RPL via a resistor R2. The series circuit of two capacitors C5 and C6 of this main circuit 23 is coupled over between the connecting ends 8A and 8B of the high intensity discharge lamp 8. The LC resonance circuit 24 operates at a resonance frequency when the inductors L2 and L3 saturate, thus the high-intensity discharge lamp 8 produces an electrical breakdown. So that, a high voltage necessary for starting the glow discharge is obtained. Since a large resonance current flows to the LC resonance circuit 24 at the start-up operation of the glow discharge of the high-intensity discharge lamp 8, the inductors L2 and L3 saturate due to the resonance current. Here, since a current which flows to the high-intensity discharge lamp 8 during the glow discharge, at the glow-arc transition time, and during the arc discharge time, the inductors L2 and L3 fail to saturate.

Moreover, a snubber circuit 26 which serves as an auxiliary power source for a oscillation driver IC 25 (Model UBA2021T which is available from Philips Semiconductor Ltd.), as described later, is coupled in parallel to the field-effect transistor Q2. The snubber circuit 26 is constructed by a capacitor C7, a series circuit of a diode D3 and a capacitor C8, and a diode D4 which is coupled in parallel to the series circuit of the diode D3 and the capacitor C8.

Furthermore, pins P5 and P6 of the oscillation driver IC 25 are connected to the gates of the field-effect transistors Q1 and Q2. A pin P1 of the oscillation driver IC 25 is coupled to a connection node of the field-effect transistors Q1 and Q2. A pin P3 of the oscillation driver IC 25 is coupled to a connection node of the field-effect transistor Q1 and Q2. Pins P12 and P13 of the oscillation driver IC 25 are coupled to a pin P8 of the oscillation driver IC 25. The pins P12 and P13 are connected to the pin P8 via capacitors C12 and C13. A pin P10 of the oscillation driver IC 25 is coupled to the pin P8 via resistors R3 and R4 in the order. A negative electrode power-terminal pin P7 of the oscillation driver IC 25 is coupled to the reference potential line RPL. Here, a resistor R3, a variable resistor R4, and a capacitor C12 constitute a time-constant circuit for determining an oscillation frequency of the oscillation driver IC 25. Further, a positive electrode side of the double-voltage rectifier 21 is connected to a positive electrode power terminal pin P13 of the oscillation driver IC 25 via a start-up resistor R5, and a negative electrode side of it is coupled to a negative electrode power terminal pin P7 of the oscillation driver IC 25 via the resistor R2.

Furthermore, a lamp voltage detection circuit 27 is coupled across connecting terminals 8A and 8B of the high-intensity discharge lamp 8 via the resistor R2. The lamp voltage detection circuit 27 is constructed by a resistor R6, a series circuit of resistors R7 and R8, and a series circuit of a diode D5 and a capacitor C14 which is coupled in parallel to the series circuit of the resistors R7 and R8. Furthermore, a series circuit of a resistor R11, a Zener diode ZD1 and a capacitor C15 is coupled to a capacitor C14 of the lamp voltage detector 27. A connection node of the Zener diode ZD1 and the capacitor C15 is coupled to the base of a transistor Q3. A resistor R12 is coupled across the base and the emitter of the transistor Q3, and the collector of the transistor Q3 is coupled to the pin P5 of the oscillation driver IC 25 and the snubber circuit 26.

Further, a series circuit of a capacitor C16 and a diode D6 is coupled in parallel to the resistor R8. A diode D7 is coupled between the connection node of the the capacitor C16 and the diode D6 and a timer circuit 28. The timer circuit 28 is constructed by a switching transistor Q4, capacitors C17, C18 and a diode D8. The collector of the transistor Q4 is coupled to the diode D7, while the emitter of the transistor Q4 is coupled to the reference potential line RPL. The capacitor C17 is coupled across the transistor Q4. The capacitor C18 and the diode D8 are connected in series with each other, and then the series circuit is coupled across the transistor Q4. Then the connection node of the capacitor C18 and the diode D8 is coupled to the base of the transistor Q4. On the other hand, a resistor R14 is coupled in parallel with the timer circuit 28. A series circuit of a Zener diode ZD2 and a resistor R15 is coupled across the collector-emitter path of the transistor Q4.

Moreover, a capacitor C19 is coupled in parallel to the resistor R15. The gate of a thyristor Q5 is coupled to a connection node of the Zener diode ZD2 and the capacitor C19. The anode of the thyristor Q5 is coupled to the pin P5 of the oscillation driver IC 25 through a diode D9. The cathode of the thyristor Q5 is coupled to the reference potential line RPL. Furthermore, a connection node of the diode D9 and the thyristor Q5 is coupled to the positive electrode of the double-voltage rectifier 21 via a resistor R16.

Now the operation of the first embodiment will be explained.

First, a DC generated by rectifying and smoothing an AC voltage of the commercial AC power source e in the double-voltage rectifier circuit 21 is supplied to the electronic ballast 22. A small current is supplied to the oscillation driver IC 25 via the start-up resistor R5 from the electronic ballast 22. The oscillation driver IC 25 makes the electronic ballast 22 oscillate by alternately turning on and off the field-effect transistors Q1 and Q2. Immediately after that the oscillation has started, the oscillation driver IC 25 operates in a frequency which is twice or more of the operation frequency of the high intensity discharge lamp 8 in lighting state. Moreover, since the electronic ballast 22 oscillates at the high frequency immediately after that the oscillation has started the oscillation driver IC 25 is kept in operation by being supplied a power from the snubber circuit 26. Here, since the oscillation frequency rises higher only the time immediately after that the electronic ballast 22 has started oscillation, a steady-state current of power source is stably supplied to the oscillation driver IC 25.

After the start of the oscillation, the oscillation driver IC 25 gradually lowers the oscillation frequency until an advancing phase is detected in the resistor R2 for detecting an advancing phase oscillation. At that time, the operating frequency matches with the resonance frequency at the time of the saturation of the inductors L2 and L3. At the time of starting the glow discharge while the high intensity discharge lamp 8 is not discharging at all, the inductors L2 and L3 saturate due to the resonance current. Thus, the inductors L2 and L3 output high voltages. At that time, a voltage for starting the glow discharge of the high-intensity discharge lamp 8 is produced over the series circuit of the capacitors C5 and C6.

On the other hand, at the glow discharge and the glow-arc transition time of the high-intensity discharge lamp 8, since a small current of about 10 mA flows the circuit, the resonance current lowers, and the inductors L2 and L3 fail to saturate. In such a condition, when a lamp current is supplied for about two seconds, the glow-arc transition is took place. So that, the high-intensity discharge lamp 8 is started up into a lighting state.

This is effective for a high-intensity discharge lamp, in which a neon and an argon are filled e.g., and which requires a high voltage to keep the glow discharge.

Figure 3:
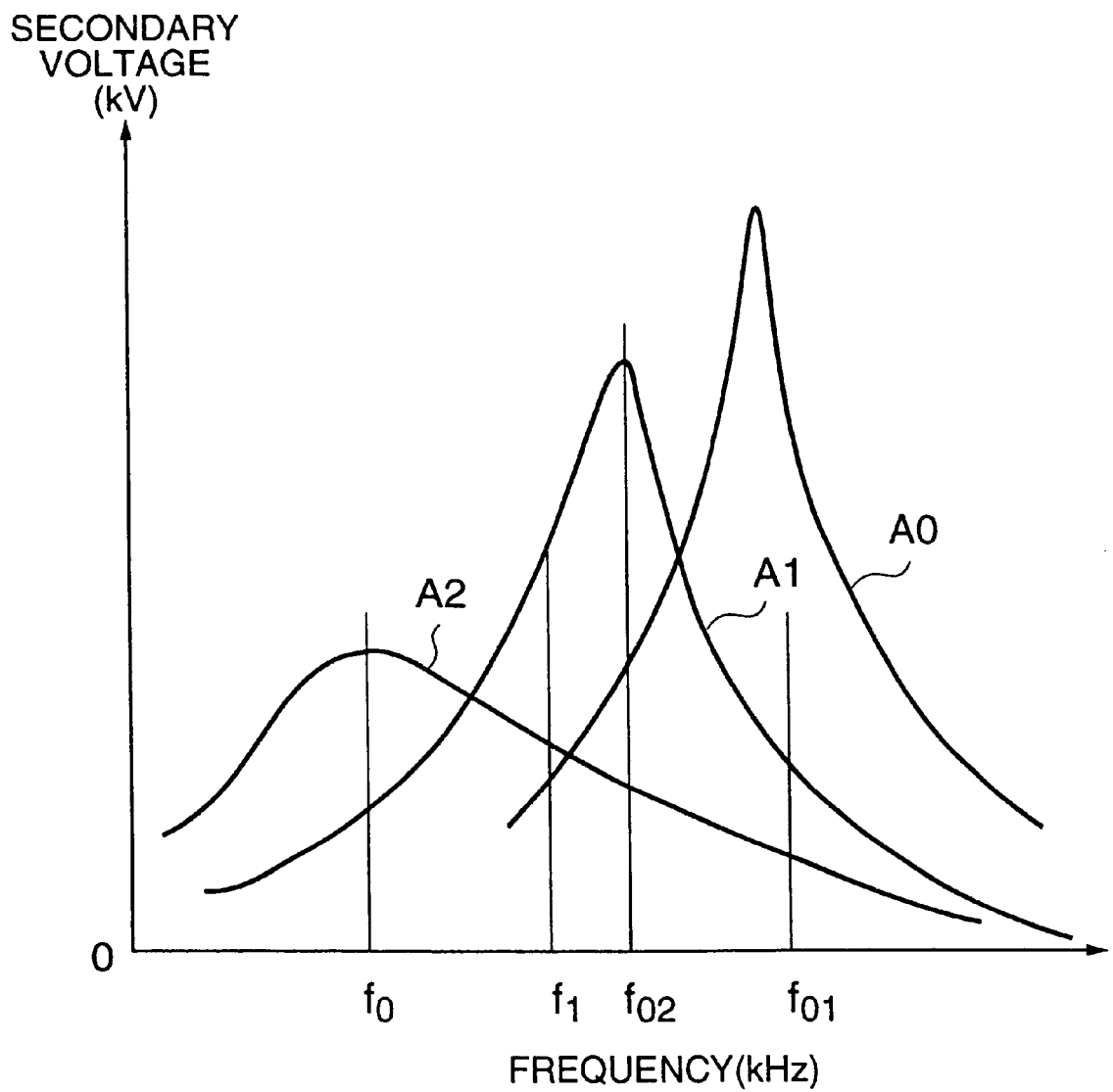
FIG. 3 a graph showing the relation between the secondary voltage and the frequency in the first embodiment of the high-intensity discharge lamp lighting apparatus according to the present invention.

When the high intensity discharge lamp 8 is in a normal lighting state, the electronic ballast 22 operates at the frequency of 20 kHz or more of unloaded main circuit 23 wherein the inductors L2 and L3 fail to saturate, as shown in FIG. 3, that is, for instance, a constant frequency almost equal to the resonance frequency of 46 kHz. That is, the high-intensity discharge lamp is regularly lighted at a frequency which is equivalent to a resonance frequency having a resonance characteristic curve A1 at the no-load state wherein the inductors L2 and L3 fail to saturate on a resonance characteristic curve A2 at the lighting time. Thus, after the high intensity discharge lamp 8 transfers to an arc discharge, it is able to oscillate the electronic ballast 22 at a constant frequency which is free from acoustic resonance. As a result, the high-intensity discharge lamp 8 can be lighted over all the life periods.

A resonance characteristic curve AO during the inductors L2 and L3 saturate has a resonance point f01 that is higher than a resonance characteristic curve A1 at the no-load state. Here, the resonance point f01 differs according to the saturation levels of the inductors L2 and L3.

When the high intensity discharge lamp 8 is in a light-off state, the voltage applied across the high-intensity discharge lamp 8 rises. Accordingly, the electric potential of the connection node of the resistors R6 and R7 in the lamp voltage detection circuit 27 rises, and the electric potential of the capacitor C14 also rises. When the electric potential of the capacitor 14 becomes a predetermined value or more, the Zener diode ZD1 is turned on, and a base current is applied to the transistor Q3. So that, the transistor Q3 is turned On. Therefore, an output voltage Vc of the snubber circuit which is coupled to the transistor Q3 lowers. As a result, the oscillation driver IC 25 which uses the snubber circuit 26 as an auxiliary power source is shut off. So that, the electronic ballast 22 halts oscillation, as shown in FIGS. 4A to 4D. When the electronic ballast 22 halts oscillation, an electric potential of the LC resonance circuit 24 lowers, and the electric potential of the connection node of the resistors R6 and R7 in the lamp voltage detection circuit 27 also lowers. So that, a capacitor C14 which is coupled to the connection node of the resistors R6 and R7 via a diode D5 is discharged. Thus, when the electric potential of the capacitor C14 is reduced lower than a predetermined value, the Zener diode ZD1 is turned off, and the base current of the transistor Q3 is interrupted. So that, the transistor Q3 is turned off. Accordingly, the oscillation driver IC 25 is biased to the operation state. At that time, a start-up current flows from a start-up resistor R5 to the oscillation driver IC 25, thus, the electronic ballast 22 starts oscillation. Then, the current is supplied also from the snubber circuit 26, the electronic ballast 22 starts to operate at a normal frequency of 46 kHz after it operates a frequency of 115 kHz which is 2.5 times as much as the operating frequency at the lighting operation time. So that, the output of it increases. Thus, as the charge and discharge of the capacitor C14 is repeated, the voltage is applied to the high-intensity discharge lamp 8 intermittently, as shown in FIGS. 4A to 4D. A peak to peak value of the AC voltage supplied to the high-intensity discharge lamp 8 is 20 kV or more at the restart-up operation, though it is 1 to 2 kV at the first start-up operation. So that, the high-intensity discharge lamp 8 is maintained in the lighting-off state without lighting on the lamp 8.

For instance, in the late stage of the lamp life, the voltage applied to the high-intensity discharge lamp 8 rises. The electric potential at the connection node of the resistors R7 and R8 in the lamp voltage detection circuit 27 also rises. And then, the potential of the capacitor C17 coupled to the connection node of the resistors via the diode D5 and the resistor R11 rises. When the electric potential of the capacitor C17 rises higher than a predetermined value, the Zener diode ZD2 is turned on. Then a trigger voltage is applied to the gate of a thyristor Q5. Thus, the thyristor Q5 is turned on. As a result, a series circuit comprised of the diode D9 and the thyristor Q5 is brought into conduction. Thus, the voltage Vcc of the snubber circuit 26 lowers. The current supplied to the oscillation driver IC 25 from the snubber circuit 26 is halted. As a result, since the voltage Vcc of the power input terminal pin PS in the oscillation driver IC 25 lowers below the oscillation sustaining voltage, the electronic ballast 22 halts oscillation. Since the thyristor Q5 is kept in conduction by a current supplied from the resistor R16, the oscillation halting makes the electronic ballast 22 suspend the oscillation driver IC 25 until the power source is reset. In other words, the electronic ballast 22 is kept in a shut-off state.

Moreover, when the inductors L2 and L3 saturate, the inductances of those inductors 12 and L3 lower, while the resonance frequency of the LC resonance circuit 24 rises. In this case, the electronic ballast 22 oscillates in the state of advancing phase. When the field-effect transistor Q2 is turned on by the oscillation driver IC 25 under the advancing phase oscillation state of the electronic ballast 22, an inverse voltage occurs across the resistor R2 and then it is input to the oscillation driver IC 25. Therefore, when the inverse voltage of the resistor R2 is detected by the voltage detecting terminal pin P9 of the oscillation driver IC 25, it is determined that the electronic ballast 22 is in the advancing phase oscillation state. When it is determined that the electronic ballast 22 is in the advancing phase oscillation state, the oscillation driver IC 25 makes the operation frequencies of the transistors Q1 and Q2 rise in order to return the operation of the electronic ballast 22 from the advancing phase state to the normal operation. As a result, the oscillation frequency is controlled to coincide with the resonance point.

Furthermore, since the inductors L2 and L3 fail to saturate while the high-intensity discharge lamp 8 is under the state of the arc discharge operation, the electronic ballast 22 oscillates in the advancing phase state. However, when a small current flows and the so-called no-load secondary voltage is generated while the high-intensity discharge lamp fails to start the glow discharge, and it starts the glow discharge, the inductors L2 and L3 saturate. The electronic ballast 22 then oscillates in the state of advancing phase at the dead time when the field-effect transistors Q1 and Q2 are both turned off. Thus, there is a fear of flowing an advancing phase current.

So, the dead time when the field-effect transistors Q1 and Q2 are turned off for preventing a short circuit is set to 1 $\mu$sec. in ordinary time. While it is set to 0.1 $\mu$sec. at the occurrence of the no-load secondary voltage.

Figure 5:
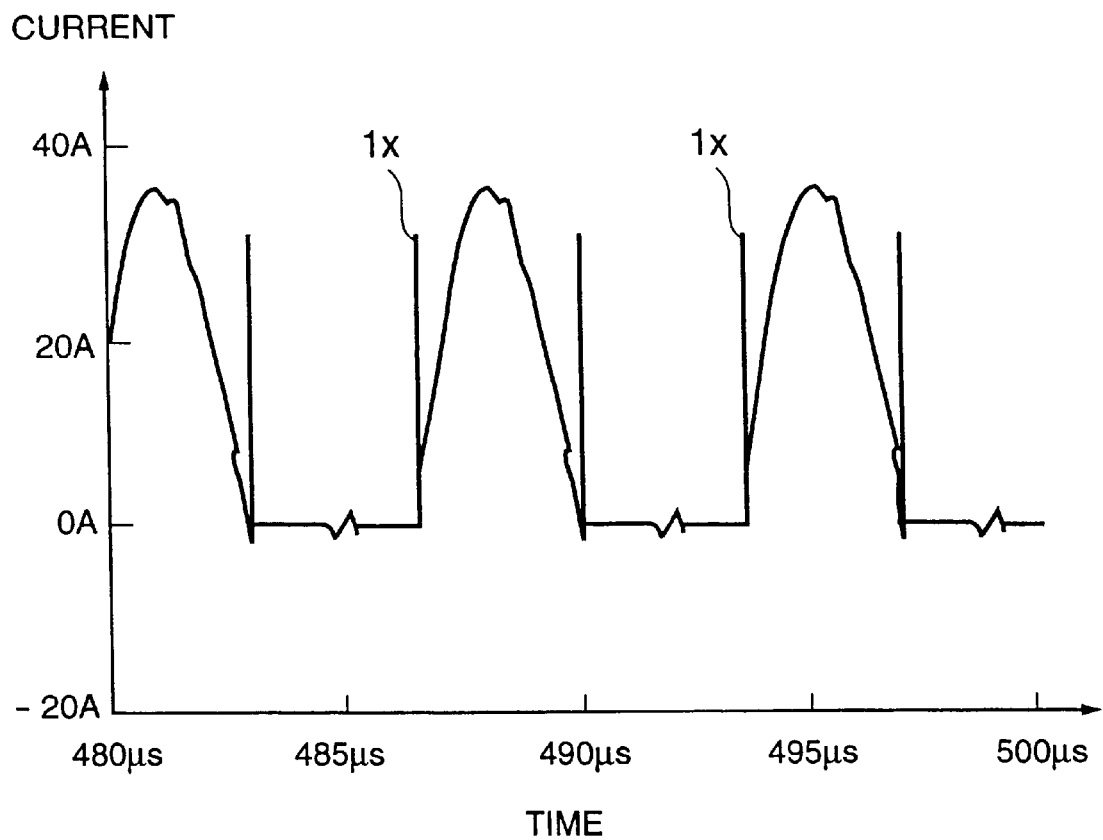
FIG. 5 is a graph showing a current of the field-effect transistor when the dead time lasts long in the first embodiment of the high-intensity discharge lamp lighting apparatus of the present invention.
Figure 6:
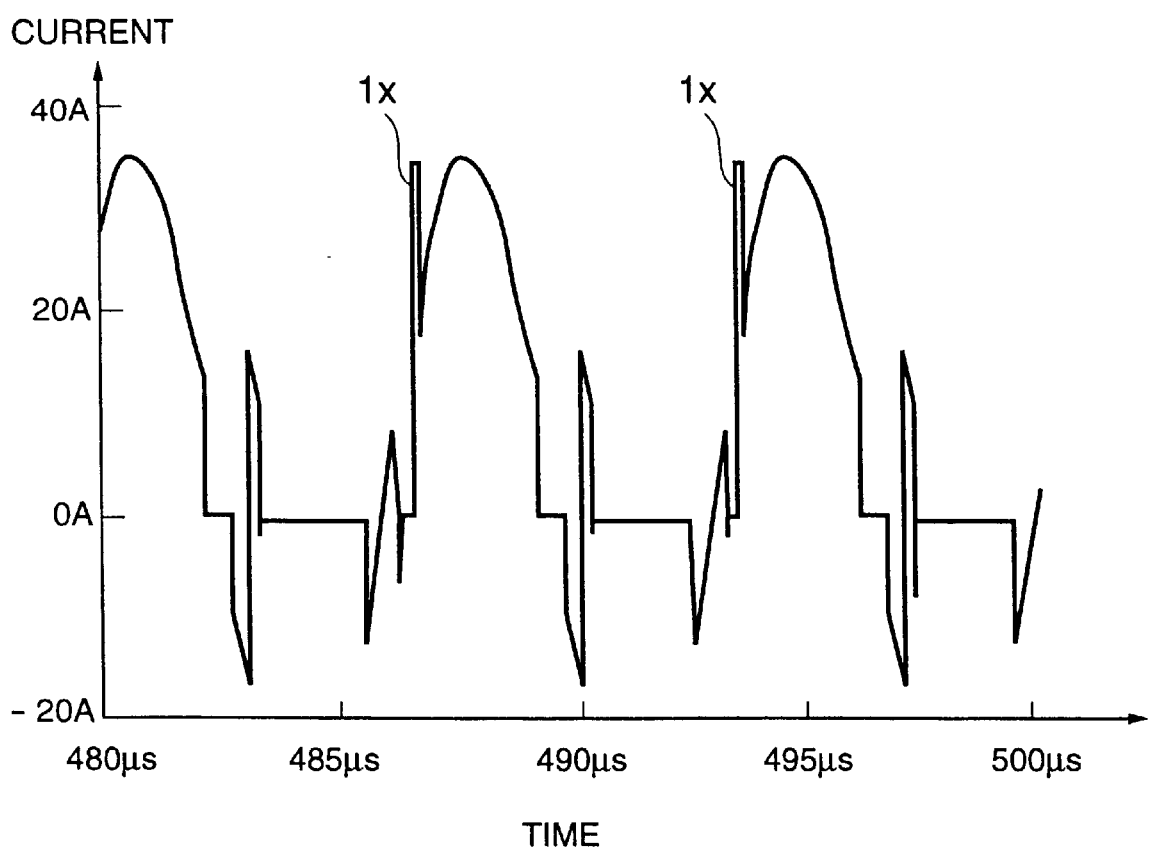
FIG. 6 is a graph showing a current of the field-effect transistor when the dead time lasts in short time in the first embodiment of the high-intensity discharge lamp lighting apparatus according to the present invention.

According to a simulation, when a dead time is 1 $\mu$sec. as in the case of normal operations, the advancing phase oscillation period lasts as it is. Then the advancing phase current Ix has been generated for a relatively long time, as shown in FIG. 5. When the dead time is set to 0.1 $\mu$sec., which is $\frac{1}{10}$ times the normal operation time, the advancing phase oscillation period decreases, and the duration of the advancing phase current Ix has been generated also decreases, as shown in FIG. 6.

So, in the first embodiment of the present invention, since the oscillation driver IC 25 is able to be operated with an auxiliary power of the snubber circuit 26 at the instant following the start of operation of the electronic ballast 22, the start-up resistor R5 just operates to feed a small current. That results in reducing the size of the resistor R5.

Since the high-intensity discharge lamp 8 does not have thermal cathode, in addition, it does not need to emit a thermion at the start of the glow discharge, it can start a glow discharge in a short time. Here, even though the inductors L2 and L3 saturate, it does not last so long time, so it is not a problem. On the other hand, if a current of about 10 mA is supplied to the lamp when the inductors L2 and L3 saturate, the stress to the circuit will become large. Thus, the inductors L2 and L3 are adapted to avoid saturations in the glow discharge operation and at the start of the arc discharge. Furthermore, since the high-intensity discharge lamp 8 requires a high start-up voltage when the lamp 8 is restarted under a high temperature condition, the inductors L2 and L3 are miniaturized while ensuring its start-up performance by minimizing the saturation time which is required for starting the glow discharge.

Figure 7:
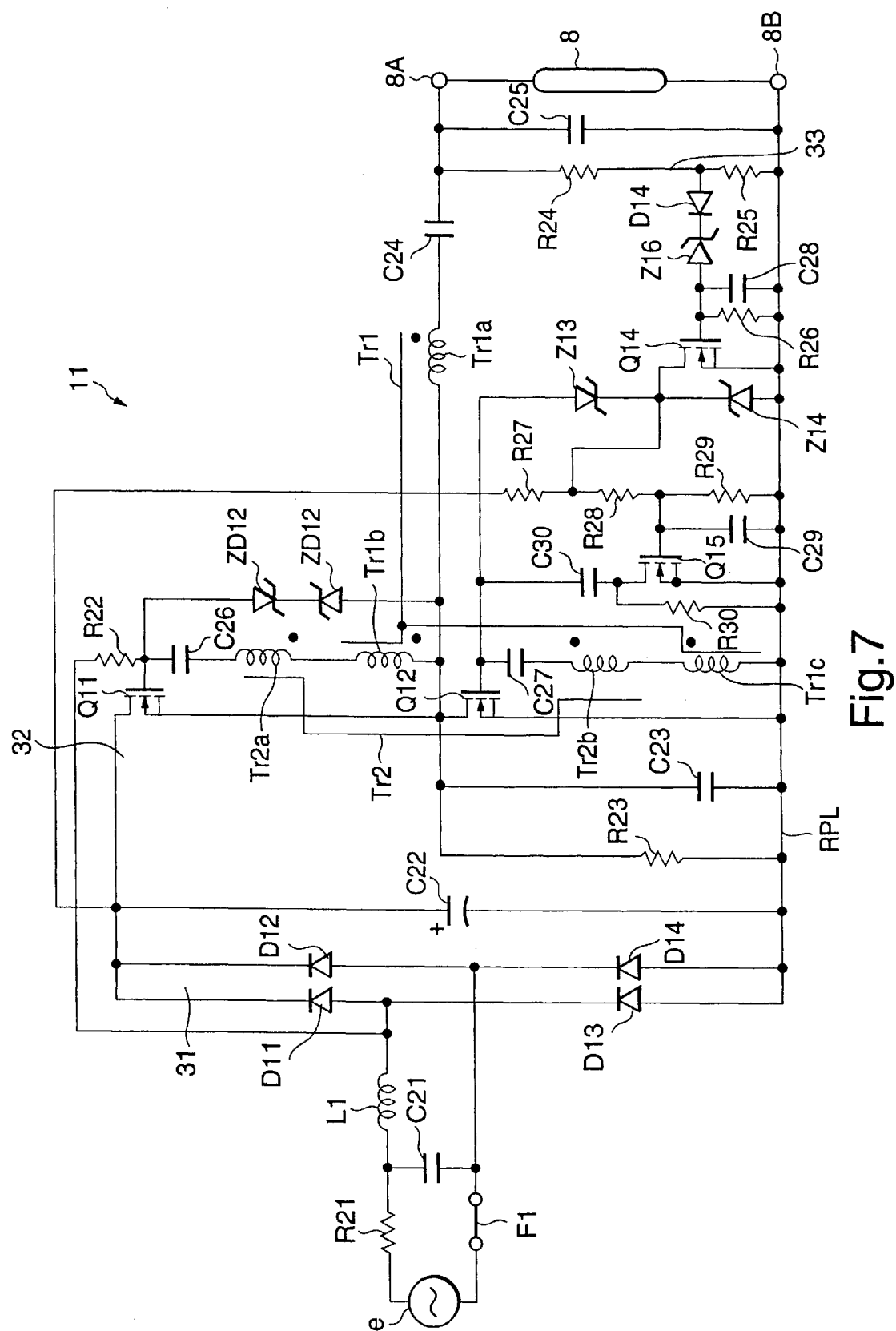
FIG. 7 is a circuit diagram showing the second embodiment of the high-intensity discharge lamp lighting apparatus according to the present invention

Referring now to FIG. 7, the second embodiment of the high-intensity discharge lamp lighting apparatus 11 according to the present invention will be explained hereinafter.

FIG. 7 is a circuit diagram showing the second embodiment of the high-intensity discharge lamp lighting apparatus 11. As shown in FIG. 7, the high-intensity discharge lamp lighting apparatus 11 is coupled to a commercial AC power source e via an input circuit comprised of a resistor R21, a fuse F1, a capacitor C21, and an inductor L11. The input circuit is coupled to a full-wave rectifier 31. The full-wave rectifier 31 is a diode bridge circuit consisting of four diodes D11, D12, D13, and D14. A smoothing capacitor C22 and an electronic ballast 32 are each connected across the positive and negative output terminals of the full-wave rectifier 31. In addition, the negative output terminal of the full-wave rectifier 31 is also a reference potential line RPL.

This electronic ballast 32 is constructed in a half-bridge configuration wherein two field-effect transistors Q1 and Q12 performing switching operations are coupled in series with each other. The gate of the field-effect transistor Q11, whose drain is connected to the negative of the full-wave rectifier 31, is coupled to a connection node of the inductor L11 of the input circuit and the diode D11 of the full-wave rectifier 31 via a start-up resistor R22. The source of the field-effect transistor Q12, whose source is again connected to the positive side of the full-wave rectifier 31, that is the reference potential line RPL, is also coupled to the reference potential line RPL via a start-up resistor R23 and a snubber capacitor C23 connected in parallel.

A connection node of the field-effect transistors Q11 and Q12 is coupled to one connecting terminal 8A of the high-intensity discharge lamp 8 via a primary winding Tr1a of a transformer Tr1 and a DC-blocking capacitor C24 in order. Here, the primary winding Tr1a performs as a ballast chalk function, too. The other connecting terminal 8B of the high-intensity discharge lamp is coupled to the reference potential line RPL. A resonance capacitor C25 is connected across the connecting terminals 8A and 8B of the high-intensity discharge lamp 8. Further, Zener diodes ZD11 and ZD12 are coupled in series with opposite polarities each other between the gate and the source of the field-effect transistor Q11. Also, Zener diodes ZD13 and ZD14 are coupled in series with opposite polarities each other between the gate and the source of the field-effect transistor Q12.

In addition, between the gate and the source of the field-effect transistor Q11, a series circuit of a capacitor C26, a primary winding Tr2a of the transistor Tr2, and a secondary winding Tr1b of the transistor Tr1 is connected. Also, across the gate ad the source of the field-effect transistor Q12, a series circuit of a capacitor C27, a secondary winding Tr2b of the transistor Tr2, and a secondary winding Tr1c of the transistor Tr1 is connected.

Furthermore, a series circuit of resistors R24 and R25 for detecting a lamp voltage is connected across the connecting terminals 8A and 8B of the high-intensity discharge lamp 8. These resistor R24 and R25 constitute an acoustic resonance detector 33. A connection node of the resistors R24 and R25 is coupled to the reference potential line RPL via a series circuit of a diode D14 and a Zener diode ZD16 with opposite polarities and a parallel circuit of a resistor R26 and a capacitor C28 in order. A connection node of the series circuit of the diode D14 and the Zener diode ZD16 and the parallel circuit of the resistor R26 and the capacitor C28 is coupled to the gate of a field-effect transistor Q14. A source of the field-effect transistor Q14 is coupled to the reference potential line RPL, and its drain is coupled to the connection node of the Zener diodes ZD13 and ZD14 which are coupled in series with the opposite polarities each other between the source of the field-effect transistor Q12 and the reference potential line RPL. Further, the source of the field-effect transistor Q14 is coupled to a connection node of a resistor R27 and R28 of a series circuit which is comprised of the resistors R27, R28, and R29 connected between the negative output terminal of the rectifier 31 and the reference potential line RPL. Moreover, a connection node of the resistors R28 and R29 is coupled to the reference potential line RPL via a capacitor C29. In addition, the connection node of the resistors R28 and R29 is also coupled to the gate of a field-effect transistor Q15. A drain of the field-effect transistor Q15 is coupled to the gate of the field-effect transistor Q12 via a capacitor C30, and its source is coupled to the reference potential line RPL. Further, the drain of the field-effect transistor Q15 is also coupled to the reference potential line RPL via a resistor R30.

Now, the operation of the second embodiment will be explained hereinafter.

First, the AC voltage of the commercial AC power source e is rectified in the full wave rectifier 31, and smoothed in the capacitor C22 so as to obtain the DC voltage, then the DC is applied to the electronic ballast 32. Further, the AC voltage of the commercial AC power source e flows into the series circuit comprised of the start-up resistor R22, the Zener diode ZD11, the Zener diode ZD12, and the start-up resistor R23, while the field-effect transistor Q11 is turned on with the potential obtained at the anode of the Zener diode ZD11. Then, the AC voltage smoothed in the capacitor C22 turns on and off the field-effect transistors Q11 and Q12 in the electronic ballast 32 by turns. According to the switching operation, a high frequency alternating current is generated. The high frequency alternating current is supplied to the high intensity discharge lamp 8 for lighting the lamp.

Figure 8:
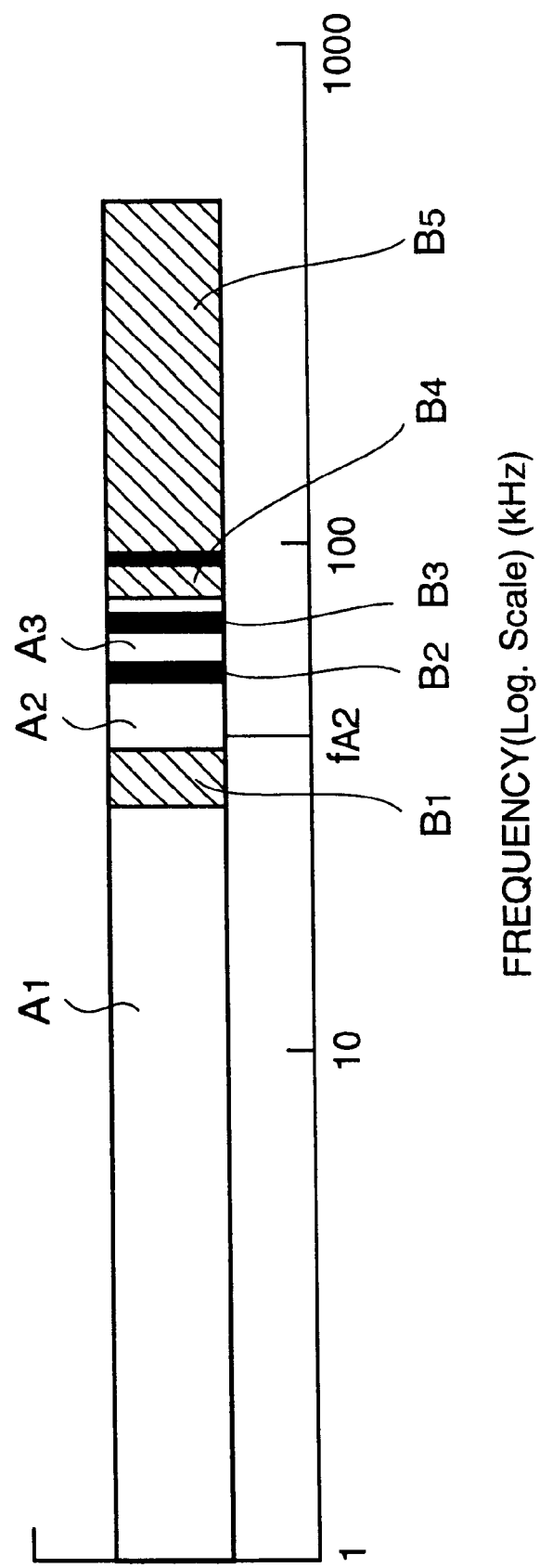
FIG. 8 is a diagram explaining the relation between the stable operation window and the frequency in the second embodiment of the high-intensity discharge lamp lighting apparatus according to the present invention.

The operating frequency of the electronic ballast 32 is chosen within one frequency band of the stable operation windows A1, A2, and A3 shown in FIG. 8 so that the acoustic resonance of the high intensity discharge lamp 8 may not occur. For example, a frequency fA2 near the lower limit of the stable operation window A2 is chosen as an example. Here, other windows B1 through B5 shown in FIG. 8 are frequency bands where acoustic resonance might occur.

That is, if the operating frequency of the electronic ballast 32 is fA2 in the stable operation window A2, an acoustic resonance will not occur in the high intensity discharge lamp 8. If the operating frequency of 20 kHz or less is chosen, there is a drawback of upsizing the transformers Tr1 and Tr2 in order to realize the operating frequency. On the contrary, if a frequency of 100 kHz or more is chosen, there is also a drawback of increasing the switching loss of the field-effect transistors Q11 and Q12. Therefore, by choosing an operating frequency from the range 20 kHz to 100 kHz such as the frequency fA2 in the stable operation window A2, the acoustic resonance of the discharge lamp is avoided without upsizing the transformers Tr1 and Tr2 and increasing the switching losses of the field-effect transistors Q11 and Q12.

On the other hand, although the operating frequency fA2 is in the stable operation window A2, an acoustic resonance may still occur. That is because, in most of the cases, the operating frequency fA2 is close to a window B1 where the acoustic frequency occurs, and the area of the window B1 is expanding even into the frequency fA2 over the assumed range of an window B1 in fact.

If the acoustic resonance occurs in the high intensity discharge lamp 8, since an undulation occurs on a discharge path, the discharge path becomes longer. So, the lamp voltage of the high-intensity discharge lamp 8 rises. As a result, the voltage across the series circuit comprised of the resistors R24 and R25 as an acoustic resonance detector 33 rises. Then, the Zener diode ZD 16 is turned on, and the electrical potential at the gate of the field-effect transistor Q14 rises. So that, the field-effect transistor Q14 is turned on. When the field-effect transistor Q14 is turned on, the capacitor C30 is separated from the electronic ballast 32 in operation. Thus, the operating frequency of the electronic ballast 32 rises. Thus, the operating frequency of the electronic ballast 32 becomes higher than the upper limit of the window B1 of an actual acoustic-resonance range, and the acoustic resonance of the high-intensity discharge lamp 8 can be avoided.

As described above, in the second embodiment of the present invention, when the acoustic resonance in the high-intensity discharge lamp occurs while the electronic ballast 32 operates at its operating frequency which is close to the lower limit of the stable operation window, the operating frequency becomes higher than the upper limit of actual acoustic resonance area. It is able to achieve the same effects even when the acoustic resonance occurs in the high-intensity discharge lamp while the electronic ballast 32 operates with its operating frequency which is close to the upper limit of the stable operation window, the operating frequency becomes lower than the lower limit of the actual acoustic resonance area. For example, in the high-intensity discharge lamp lighting apparatus shown in FIG. 7, the latter can be achieved by that the field-effect transistor Q15 is turned off usually, but it is turned on when the acoustic resonance occurs.

Here, in the conventional high-intensity discharge lamp in which a central frequency in the stable operation window area was chosen as the operating frequency of the electronic ballast, when the actual area of the acoustic resonance window adjacent to the operating frequency expands to overlap the operating frequency, and the acoustic resonance occurred, it was difficult to find whether the lower end or the upper end the expanded acoustic resonance window of the operating frequency had been. Therefore, in the conventional high-intensity discharge lamp, even if the acoustic resonance occurred, the countermeasures for suppressing the acoustic resonance could not be devised. However, on the other hand, according to the circuit configuration (and the modification), the operating frequency of the electronic ballast is set to the frequency close to the lower limit (or to the frequency close to the upper limit) of the stable operation window. Therefore, when the actual area of the lower end of the acoustic resonance window (or the upper end of the acoustic resonance window) of the operating frequency overlaps the operating frequency, and the acoustic resonance occurs in the high-intensity discharge lamp 8, the lamp voltage rise of the high-intensity discharge lamp 8 incident to the resonance is detected, then the operating frequency appropriately shifts into an area where it does not overlap the actual area of the acoustic resonance window. That is, in the embodiment shown in FIG. 7, the operating frequency shifts to the frequency higher than the area where the lower end of the acoustic resonance window is expanded. On the other hand, in its alternative arrangement, the operating frequency shifts to a frequency below an expanded area of the upper acoustic resonance window. As a result, the acoustic resonance of the high-intensity discharge lamp 8 can be avoided.

Moreover, there is another conventional high-intensity discharge lamp lighting apparatus wherein the electronic ballast oscillation frequency rises or lowers to a frequency higher or lower enough to avoid the acoustic resonance. However, in the case of rising the frequency higher, there is a drawback of increasing the switching loss in the electronic ballast. On the other hand, in the case of lowering the frequency lower, there is also a drawback of upsizing the high-intensity discharge lamp lighting apparatus. As compared with those conventional ones, the high-intensity discharge lamp lighting apparatus, as shown in FIG. 7, it is able to prevent the increasing of the switching loss or the upsizing of the circuit by using the frequency from 20 kHz to 100 kHz.

Here, such a high-intensity discharge lamp lighting apparatus is effective especially to a ceramic high-intensity discharge lamp wherein a luminescence tube is hardly deformed during lighting.

Next, referring not to FIG. 9, the third embodiment of the high-intensity discharge lamp lighting apparatus 11 according to the present invention will be explained hereinafter.

Figure 9:
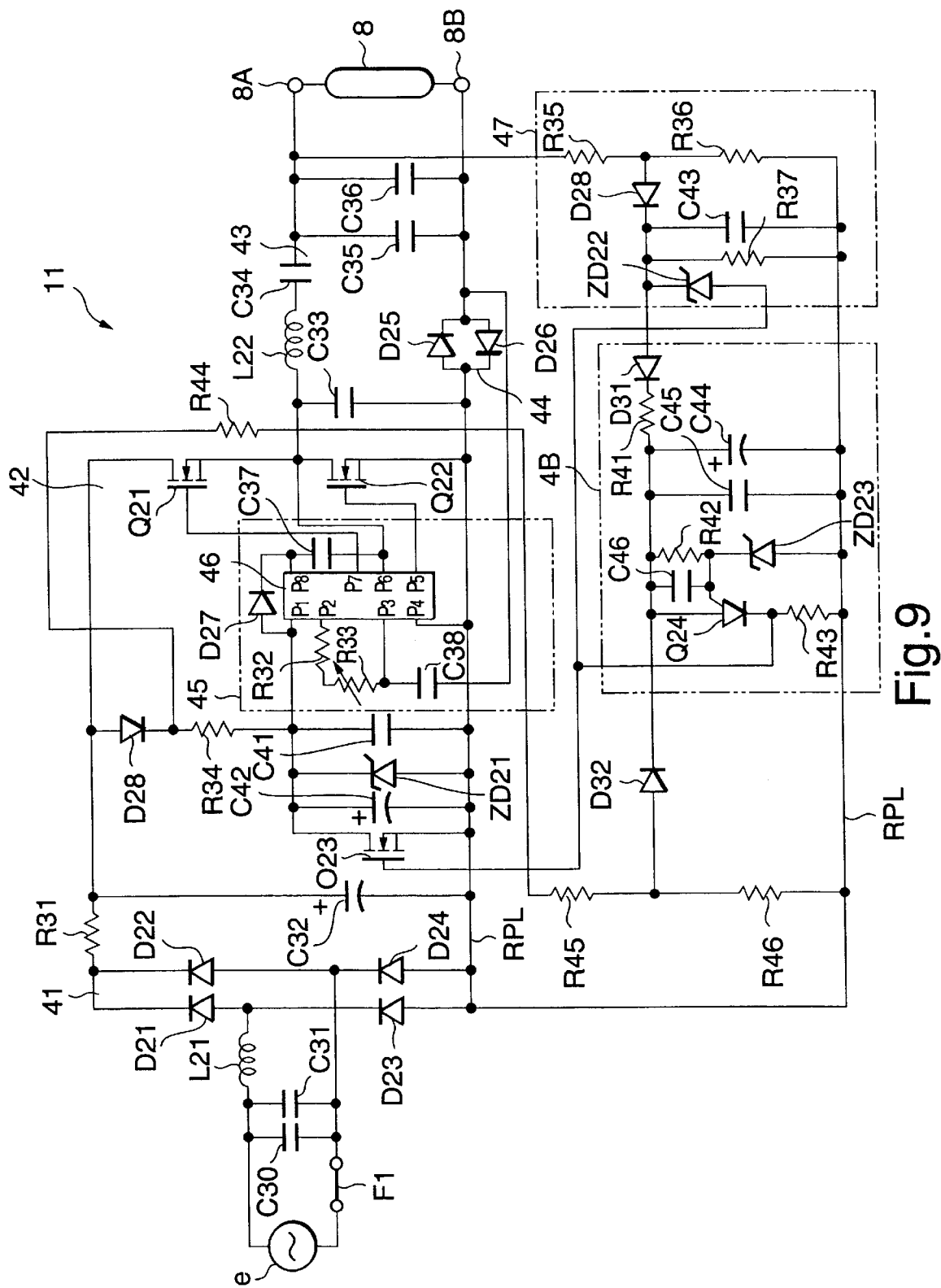
FIG. 9 is a circuit diagram showing the third embodiment of the high-intensity discharge lamp lighting apparatus according to the present invention.

FIG. 9 is a circuit diagram showing the third embodiment of the high-intensity discharge lamp lighting apparatus 11. As shown in FIG. 9, the high-intensity discharge lamp lighting apparatus 11 is connected to an AC power source e via an input circuit comprised of a fuse F2, an inductor L21, and capacitors C30 and C31. The input circuit is coupled to a full-wave rectifier 41. The full-wave rectifier 41 is constituted to a diode bridge circuit comprised of diodes D21, D22, D23, and D24. One terminal of a resistor R31 is coupled to a negative output terminal of the full-wave rectifier 41. A smoothing capacitor C32 and an electronic ballast 42 are each connected in parallel between the other terminal of the resistor R31 and a positive output terminal of the full-wave rectifier 41. In addition, the negative output terminal of the full-wave rectifier 41 is also a reference potential line RPL.

The electronic ballast 42 is constructed in a forced half-bridge configuration wherein two field-effect transistors Q21 and Q22 performing switching operations are coupled in series with each other and driven by a driving circuit 45, as described later. A capacitor C33 is coupled in parallel to the field-effect transistor Q22 whose source terminal is coupled to the negative output of the full-wave rectifier 31, i.e., the reference potential line RPL.

To the field-effect transistor Q22, a main circuit having an LC resonance circuit is also coupled in parallel. In the main circuit 43, a series circuit of an inductor L22 operating as a ballast chalk and a DC-blocking capacitor C34 is coupled between a connection node of the filed-effect transistors Q21 and Q22 and one connecting terminal 8A of the high-intensity discharge lamp 8. Moreover, a resonance point detection circuit 44 in which diodes D25 and D26 are connected in reverse parallel is coupled between the source of the field-effect transistor Q22 and the other connecting terminal 8B of the high-intensity discharge lamp. Furthermore, a parallel circuit of capacitors C35 and C36 is coupled across the both connecting terminals 8A and 8B of the high-intensity discharge lamp 8.

The driving circuit 45 for driving the field-effect transistors Q21 and Q22 is provided with an oscillation driver IC 46 (Model IR2153 which is available from International Rectifier Ltd.), and the oscillation driver IC 46 drives the gates of the field-effect transistors Q21 and Q22. That is, gate output terminal pins P7 and P5 of the oscillation circuit IC 46 are connected to each gate of the field-effect transistors Q21 and Q22. Furthermore, a pin P6 of the oscillation driver IC 46 is coupled to a connection node of the field-effect transistors Q21 and Q22, and a pin P8 is coupled to the pin P6 via a capacitor C37. A power terminal pin P1 of the oscillation driver IC 46 is coupled to the pin P8 via a diode D27. The power is applied to the power terminal pin P1 from the positive output of the full-wave rectifier 41 via a diode D28 and a resistor R34 in order. A pin P3 of the oscillation driver IC 46 is coupled to the other connecting terminal 8B of the high-intensity discharge lamp 8 via a capacitor C38. A pin P2 of the oscillation driver IC 46 is coupled to the pin P3 via a resistor R32 and a variable resistor R33 in order. And a ground terminal pin P4 of the oscillation driver IC 46 is coupled to the reference potential line RPL.

The electronic ballast 42 includes a series circuit of a diode D28, a resistor R34, and a capacitor C41 in order. In the series circuit, the diode D28 is coupled to the other terminal of the resistor R31, and the capacitor C41 is coupled to the reference potential line RPL. The connection node of the resistor R34 and the capacitor C41 is coupled to the connection node of the oscillation driver IC 46. Moreover, a Zener diode ZD21, a capacitor C42, and a field-effect transistor Q23 are coupled to the capacitor C41 in parallel.

Further, a lamp voltage detection circuit 47 is coupled to the connecting terminal 8A of the high-intensity discharge lamp 8. In the lamp voltage detection circuit 47, first, resistors R35 and R36 are coupled in series between the connection terminal 8a and the reference potential line RPL. Next, between the connection node of the resistors R35 and R36 and the reference potential line RPL, a diode D28 and a capacitor C43 are coupled in series in order. Then, a resistor R37 is coupled in parallel to the capacitor C43. A connection node of the diode D28 and the resistor R37 is coupled to the gate of the field-effect transistor Q23 of the electronic ballast 42 via a Zener diode ZD22.

Furthermore, to the resonance point detection circuit 44 is coupled a long time timer 48. In the long time timer 48, a reverse-current blocking diode D31, a resistor R41 and a capacitor C41 are coupled in series between the connection node of the resistor R37 and the diode D28 and the reference potential line RPL. And, a capacitor C45 is coupled in parallel to the capacitor C41. In addition, a series circuit of a resistor R42 and a Zener diode ZD23 is coupled in parallel in order to the capacitor C44. Furthermore, a series circuit of programmable unijunction transistor Q24 and a resistor R43 in order is coupled in parallel to the capacitor C44. To the resistor R42, a capacitor C46 is coupled in parallel. A connection node of the resistor R42 and the Zener diode ZD23 is coupled to the gate of the programmable unijunction transistor Q24. A connection node of the programmable unijunction transistor Q24 and the resistor R43 is connected to the gate of the field-effect transistor Q23 of the electronic ballast 42. Here, the time-constant circuit of the timer 48 is constructed by the capacitors C44 and C45 and the resistor R41.

On the other hand, a series circuit of resistors R44, R45, and R46 in order is coupled between the connection node of the diode D28 and the resistor R34 and the reference potential line RPL. Finally, an anode of the programmable unijunction transistor Q24 is coupled to the connection node of the series circuit of the resistors R45 and R46 via a diode D32.

Now, the operation of the third embodiment of the present invention will be explained hereinafter.

First, the AC voltage of the commercial AC power source e is rectified in the full wave rectifier 31, and smoothed in the capacitor C22 so as to obtain the DC voltage, then the DC is applied to the electronic ballast 42. In the electronic ballast 42, the field-effect transistors Q21 and Q22 are turned on and off by turns by the driving circuit 45. So that, the high frequency current obtained by the switching operation is supplied to the high-intensity discharge lamp 8.

Figure 10:
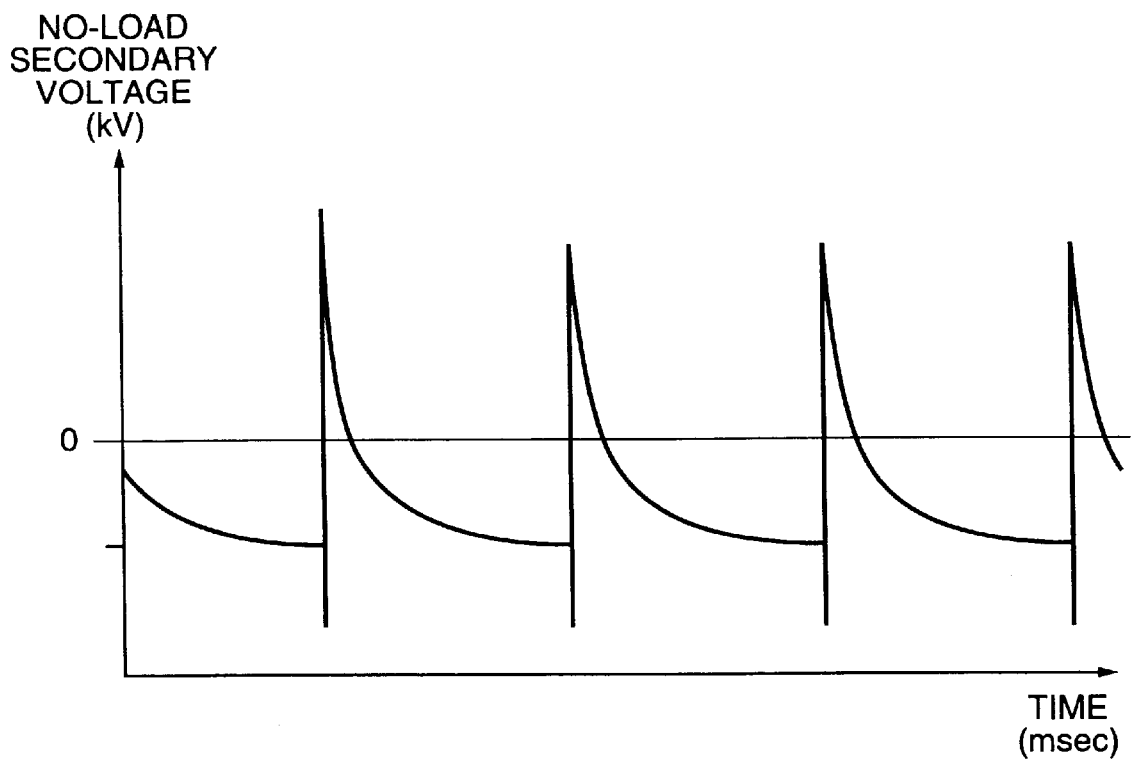
FIG. 10 is a waveform chart showing the no-load secondary voltage in the third embodiment of the high-intensity discharge lamp lighting apparatus according to the present invention.
Figure 11:
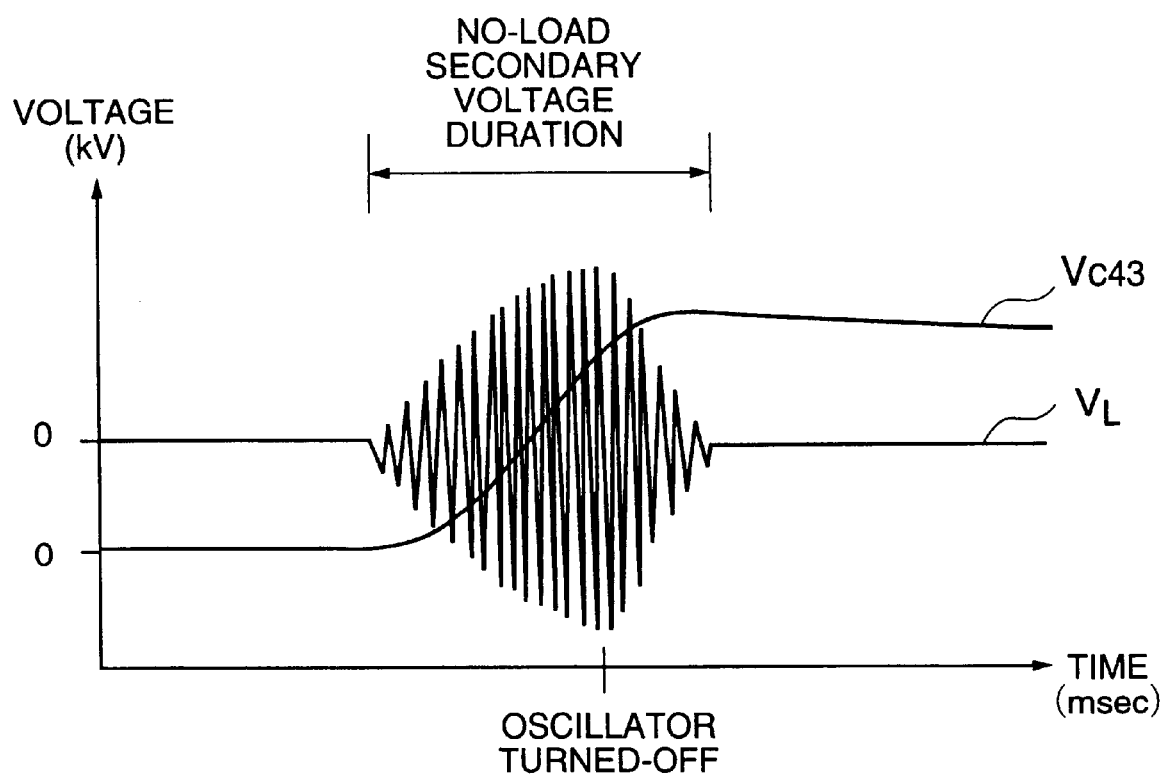
FIG. 11 is waveform chart zoomed up showing the no-load secondary voltage in the third embodiment of the high-intensity discharge lamp lighting apparatus according to the present invention.

The lamp voltage of the high-intensity discharge lamp 8 is detected by divided in the resistors R35 and R36. The divided voltage is rectified in the diode D28 and smoothed in the capacitor C43. When the no-load secondary voltage is generated, the Zener diode ZD22 is turned on, then the voltage applied to the gate of the field-effect transistor Q23 in the electronic ballast 42 rises. So that, the field-effect transistor Q23 is turned on. As a result, the pin P1 of the oscillation driver IC46 is short-circuited to the reference potential line RPL. And thus, the oscillation driver IC 45 is shut off. And also, the electronic ballast 42 is shut off. Due to that the electronic ballast 42 is shut off, the capacitor C43 is discharged so that the voltage detected by the lamp voltage detection circuit 47 drops. And thus, the Zener diode ZD22 is turned off. Therefore, the gate voltage of the field-effect transistor Q23 in the electronic ballast 42 lowers, and the field-effect transistor Q23 is turned off. Then, the oscillation driver IC 46 starts operation again, and the high-frequency current is supplied to the high-intensity discharge lamp 8 from the electronic ballast 42. Thus, according to the intermittent operation of the electronic ballast 42, an intermittent pulse, as shown in FIG. 10 occurs on the no-load secondary voltage.

Here, at the occurrence of the no-load secondary voltage the inductor L22 saturates at the no-load secondary voltage generating time, the field-effect transistors Q21 and Q22 produces heat more than normal lighting time. However, the heat from the field-effect transistors Q21 and Q22 is controlled by the intermittent operation of the electronic ballast 42 described above. In order to control the heat moderately, it is necessary to decrease the pulse duration, that is the pulse width, as shown in FIG. 10. However, since the high-intensity discharge lamp 8 fails to start up when the pulse width is too short, it is necessary to have suitable pulse width. Here, the voltage across the capacitor C43 varies, as shown by a solid line Vc43 in FIG. 11. Further, the lamp voltage of the high-intensity discharge lamp varies, as shown by another solid line VL in FIG. 11.

Since the inductor L22 saturates at the start-up of the high-intensity discharge lamp 8, a large resonance current flows into the capacitors C35 and C36, then the no-load secondary voltage rises. So that, the high-intensity discharge lamp 8 lights up.

Moreover, a frequency which is close to the upper limit or the lower limit of the stable operation window is used as a driving frequency of the high-intensity discharge lamp 8 at the lighting operation in order to prevent the acoustic resonance of the high-intensity discharge lamp 8.

On the other hand, the capacitors C44 and C45 in the timer circuit 48 are charged every time before the high-intensity discharge lamp 8 starts operation and during the no-load secondary voltage is generated intermittently. So that the voltage of the timer circuit 48 rises. When the voltage of the timer circuit 48 gets to a predetermined value or more, for example, 0.6 V or more of a Zener voltage of the Zener diode ZD23, the programmable unijunction transistor Q24 is turned on, then the gate voltage of the field-effect transistor Q23 in the electronic ballast 42 rises. So that, the field-effect transistor Q23 is turned on. As a result, the pin P1 of the oscillation driver IC46 is short-circuited to the reference potential line RPL. And thus, the oscillation driver IC 45 is shut off. And also, the electronic ballast 42 is shut off. Here, the programmable unijunction transistor Q24 remains on by a latching current which is supplied through the series circuit of the resistors R44, R45, and R46. Therefore, the oscillation driver IC 46 and the electronic ballast 42 are kept being shut-off.

Figure 12:
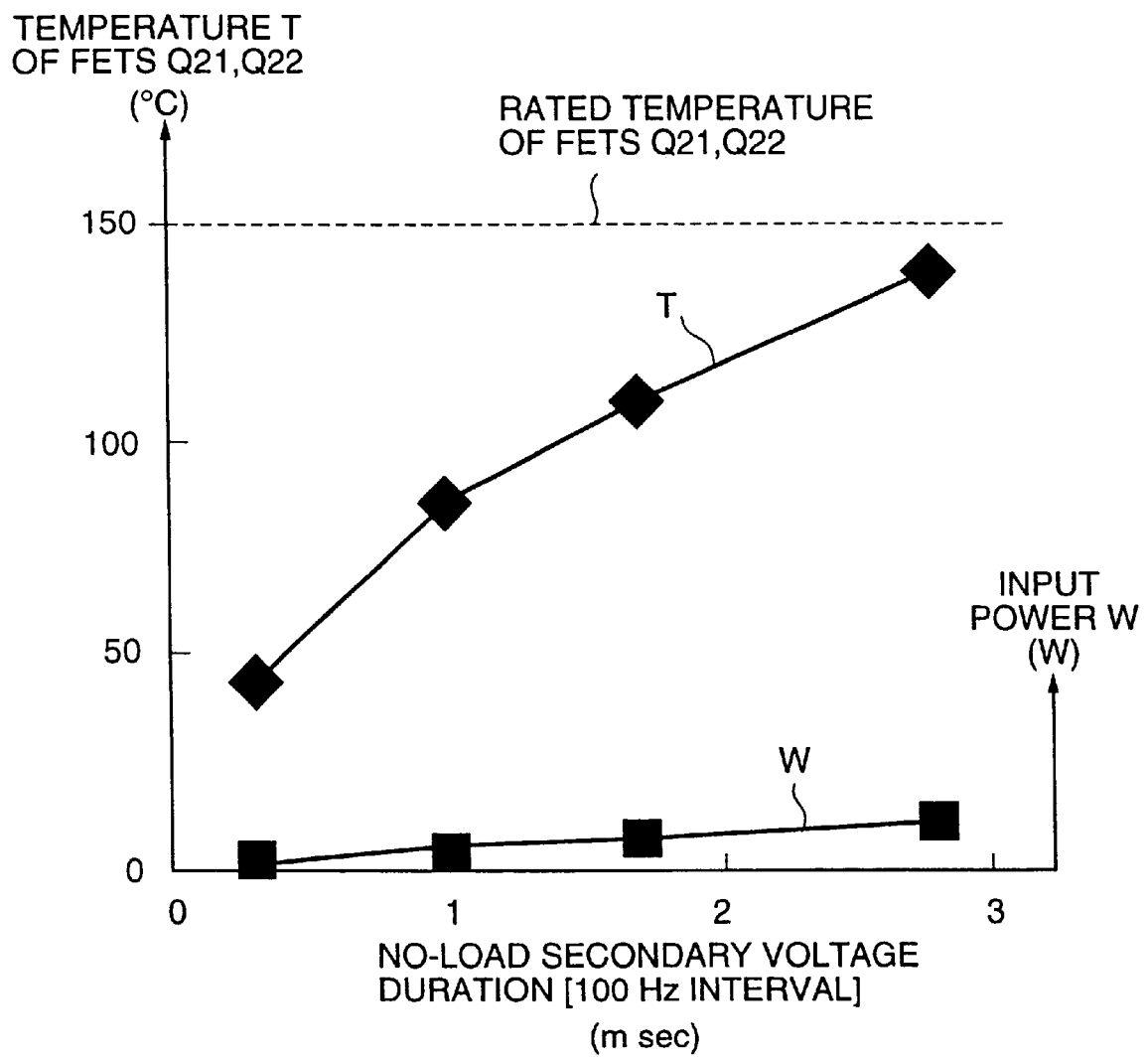
FIG. 12 is a graph showing the relation between the input power, the pulse width of the no-load secondary voltage and the temperature rise in the third embodiment of the high-intensity discharge lamp lighting apparatus according to the present invention.

When the pulse width of the no-load secondary voltage varies while the high-intensity discharge lamp 8 has an intermittent operating frequency of 100 Hz, the temperature T of the field-effect transistors Q21 and Q22 varies, as shown in FIG. 12. That is, the greater the pulse width of the no-load secondary voltage is, the higher the temperature T of the field-effect transistors Q21 and Q22 will be. Therefore, while intermittent operating frequency of the high-intensity discharge lamp 8 is 100 Hz, the pulse width of the no-load secondary voltage is set to 3 m a second or less, it is able to prevent the temperature of the field-effect transistors Q21 and Q22 gets to the temperature rating or more.

Furthermore, when the electronic ballast 42 operates in an advancing phase state, an advancing phase current flows into the high intensity discharge lamp 8. As a result, the lamp voltage of the high-intensity discharge lamp 8 rises. The voltage rise is detected by the resonance point detection circuit 44. The voltage detected by the resonance point detection circuit 44 is applied to the resistors R32, R33 in the oscillation frequency determining circuit coupled across the pins P2 and P3 of the oscillation driver IC 46 via the capacitor C38. The oscillation driver IC 46 is controlled to rise its oscillation frequency according to the detected voltage. Therefore, the operating frequency of the electronic ballast 42 rises, and the operation in the advancing phase condition of the electronic ballast 42 is canceled.

Further, when the acoustic resonance occurs in the high-intensity discharge lamp, the operating frequency of the electronic ballast 42 shifts to the frequency around the center of the stable operation window. So that, the acoustic resonance is avoided.

According to the third embodiment of the present invention, it is able to set the ratio of the operation time and the non-operation time of the no-load secondary voltage easily by using the Zener diode ZD22.

Figure 13:
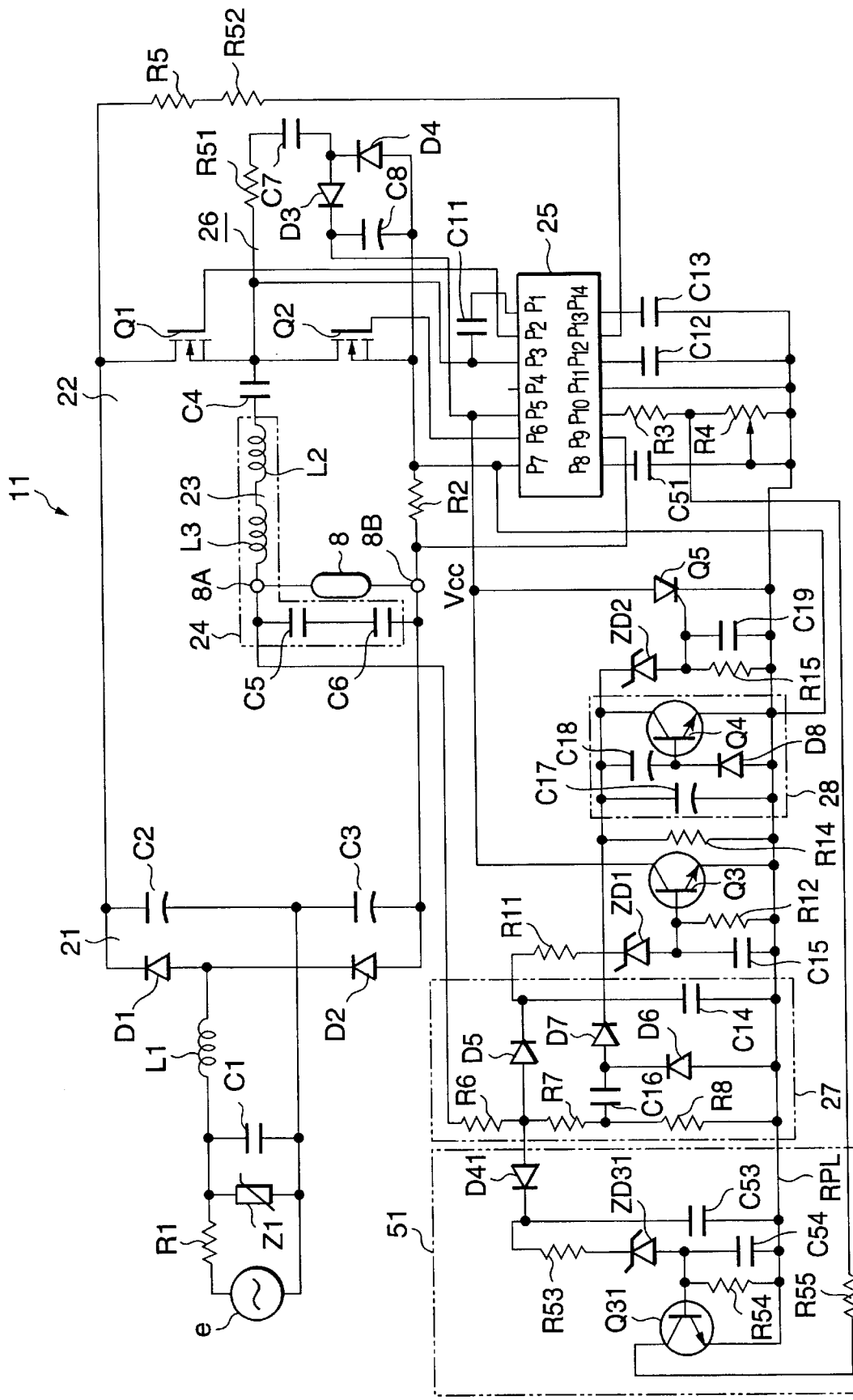
FIG. 13 is a circuit diagram showing the fourth embodiment of the high-intensity discharge lamp lighting apparatus according to the present invention.

Next, referring now to FIG. 13, the fourth embodiment of the high-intensity discharge lamp lighting apparatus 11 according to the present invention will be explained hereinafter.

The high-intensity discharge lamp lighting apparatus 11 according to the fourth embodiment of the present invention is principally the same as the high-intensity discharge lamp lighting apparatus 11 of the first embodiment, as shown in FIG. 1. Therefore, in FIG. 13, the same elements as those of the first embodiment are assigned with like reference numerals and their descriptions will be omitted. The major differences from the first embodiment are as follows. A resistor R51 is coupled to the capacitor C7 in the snubber circuit 26 in series. A resistor R52 is coupled to the resistor R5 in series. A capacitor C51 is coupled in parallel to the series circuit of the resistor R3 and the variable resistor R4, and an output reducing means 51 is coupled to the connection node of the resistor R3 and the variable resistor R4.

The output reducing means 51 is constituted as follows. It has a series circuit of a diode D41 and a capacitor C53 are coupled in order between the connection node of the resistors R6 and R7 in the lamp voltage detection circuit 27 and the reference potential line RPL. A series circuit of a resistor R53, a Zener diode ZD31 as a glow discharge detector, and a capacitor C54 is coupled in order to the connection node of the diode D41 and the capacitor C53 and the reference potential line RPL. A resistor R54 is coupled in parallel to the capacitor C54. A connection node of the Zener diode ZD 31 and the capacitor C54 is coupled to the base of the transistor Q31, and the resistor R54 is coupled between the base of the transistor Q31 and the reference potential line RPL. An emitter of the transistor Q31 is coupled across the reference potential line RPL, and its collector is coupled to the connection node of the resistors R3 and R4 via the resistor R55.

Next, operations of the fourth embodiment of the present invention will be explained hereinafter.

Here, the basic operations are the same as that of the first embodiment, as shown in FIG. 1, and the overlapping explanations are omitted.

Figure 14:
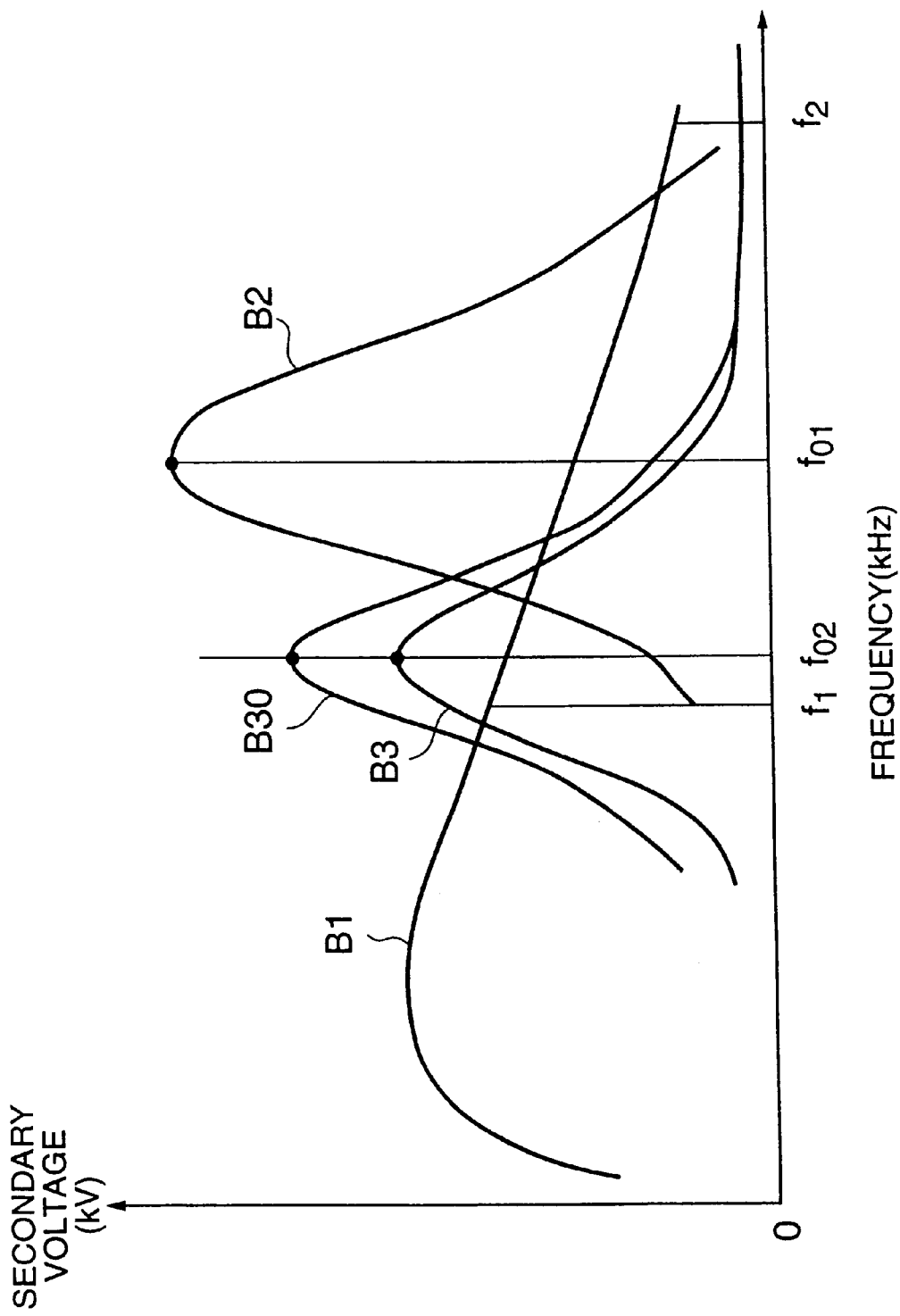
FIG. 14 is a circuit diagram showing the fourth embodiment of the high-intensity discharge lamp lighting apparatus according to the present invention.
Figure 15:
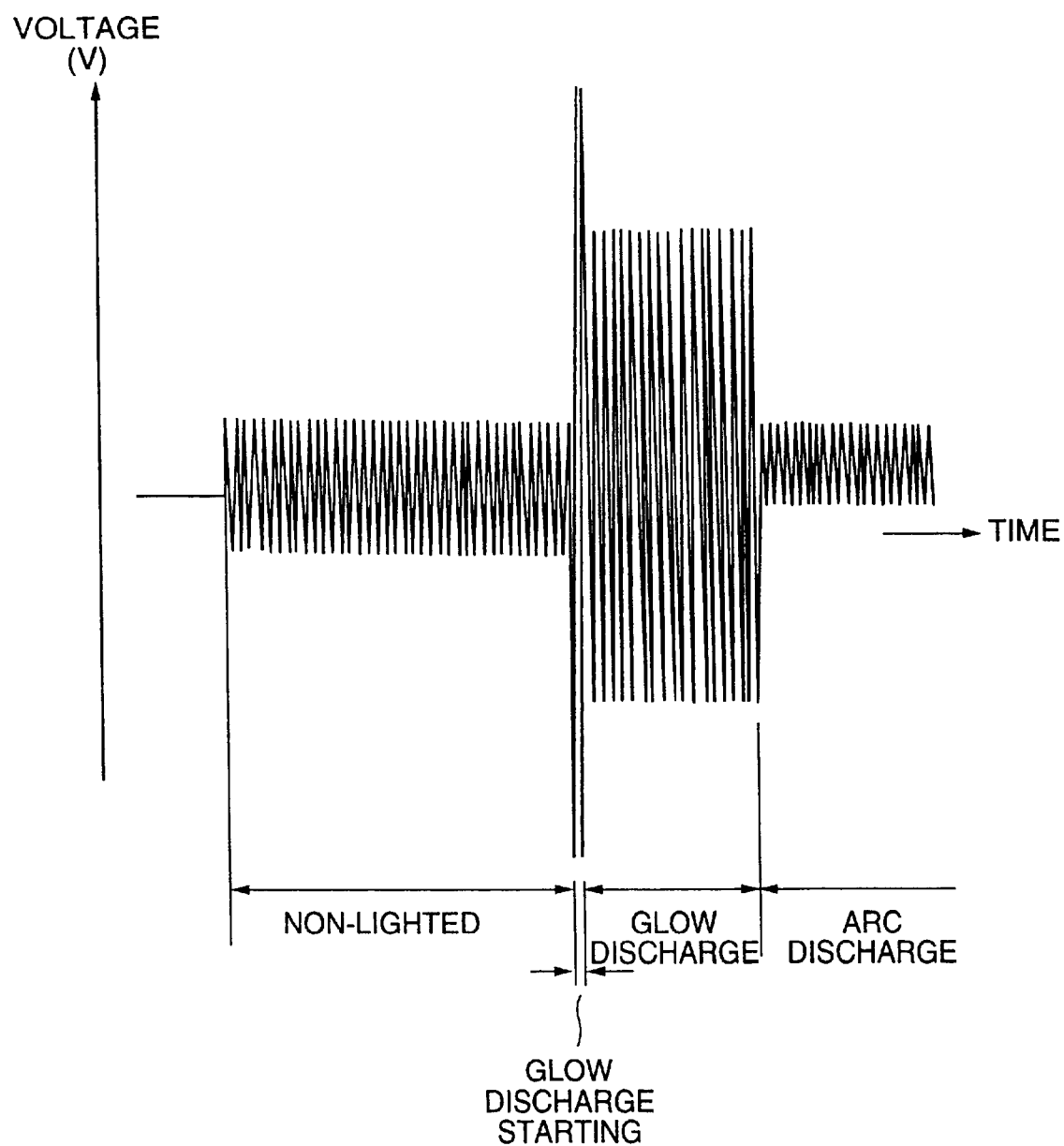
FIG. 15 is a waveform chart showing the change with time in the voltage applied to the high-intensity discharge lamp in the fourth embodiment of the high-intensity discharge lamp lighting apparatus according to the present invention.

First, referring not to FIGS. 14 and 15, the operating frequency of the electronic ballast of the fourth embodiment will be explained hereinafter.

When a power source e is turned on, and a rectified DC is supplied from the double-voltage rectifier 21, the oscillation driver IC 24 oscillates with a frequency f2, and a comparatively low voltage applied from the electronic ballast 22 with a frequency characteristic curve of B30 is applied to the high-intensity discharge lamp 8. Then, the oscillation frequency of the oscillation driver IC25 lowers until the advancing phase current is detected in the resistor R2. When the operating frequency of the electronic ballast 22 reaches around the resonance point f02 on the frequency characteristic curve B30, the glow discharge occurs in the high-intensity discharge lamp 8, then the inductors L2 and L3 of the LC resonance circuit 24 saturate. As a result, the frequency characteristic curve B2 appears.

At that time, the electronic ballast 22 operates with its operating frequency of the no-load resonance frequency f01, and a high pulse voltage occurs. Further, after the glow discharge occurs, the high-intensity discharge lamp 8 operates with the no-load resonance frequency f02 on the frequency characteristic curve B3 in the fine discharge state, while the inductors L2 and L3 of the LC resonance circuit 24 fail to saturate. At this time, a voltage which is lower than the pulse voltage which is generated at the start of the glow discharge time but higher than the voltage at the start of operation is applied to the high-intensity discharge lamp 8.

Accordingly, when the pulse voltage capable of causing the glow discharge is generated in the high-intensity discharge lamp 8, the lamp voltage of the high-intensity discharge lamp rises. Thus, the voltage applied to the connection node of the resistors R6 and R7 in the lamp voltage detection circuit 27 rises, and it is applied to the output reducing means 51 via the diode D41. So that, the Zener diode ZD as the glow discharge detector is turned on, and the capacitor C54 is started to be charged. After the time constant decided by the resistor R53 and the capacitor C54, the transistor Q31 is turned on. Then, the resistor R55 in the output reducing means 51 is coupled in parallel to the resistor R4 in the oscillation driver IC 25. Thus, the oscillation frequency of the oscillation driver IC25 rises, and the operating frequency of the electronic ballast 22 rises. According to the operating frequency rise, the voltage applied to the high-intensity discharge lamp 8 lowers to the extent in which the glow discharge is maintained.

Here, even though the current flows in the high-intensity discharge lamp 8 at the glow discharge time, the current is very little, so it can be dealt with almost like the no-load state. However, it is different in that the inductors L2 and L3 saturates before starting the glow discharge, but they fail to saturate during the glow discharge operation. Further, when the glow discharge changes to the arc discharge of the high-intensity discharge lamp 8, the Zener diode ZD31 as a glow discharge detector is turned off. Thus, the transistor Q31 is turned off, and the resistor R55 is released its parallel connection to the resistor R4 in the oscillation driver IC25. So that, the oscillation frequency of the oscillation driver IC25, that is the operating frequency of the electronic ballast 22, lowers to the frequency f1. Accordingly, the voltage applied to the high-intensity discharge lamp 8 lowers below the voltage at the start of operation before starting the glow discharge.

In addition, when the glow discharge is not detected, the oscillation driver IC 25 is reset in the lamp voltage detector 27. Therefore, at this time, the glow discharge is tried again by starting the electronic ballast 22 to operate with the same condition at the time that the power has been turned on.

Figures 16A, 16B:
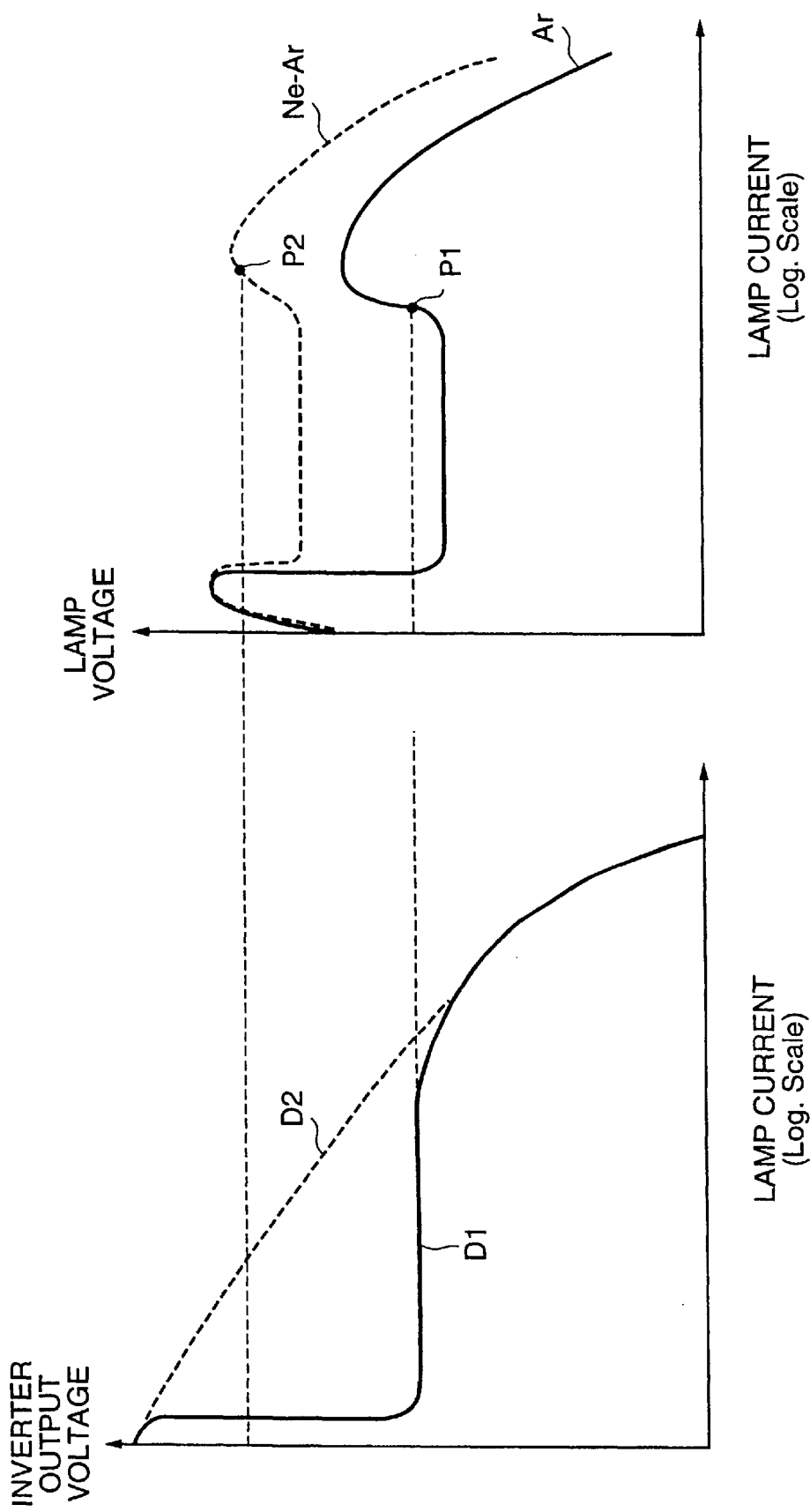
FIGS. 16A and 16B are graphs showing the relation of the output voltage and the lamp voltage in the electronic ballast to the current value applied to the high-intensity discharge lamp in the fourth embodiment of the high-intensity discharge lamp lighting apparatus according to the present invention.

Referring to FIGS. 16A and 16B, the operations of the fourth embodiment will be comparatively explained in a discharge lamp in which an argon gas (Ar) is filled and a discharge lamp in which a neon-argon mixed gas (Ne—Ar) is filled. In the high-intensity discharge lamp in which an argon gas (Ar) is filled, the voltage to the current at the glow discharge operation time is reduced, as shown by a solid line D1 in FIG. 16A. That is, in the high-intensity discharge lamp in which an argon (Ar) is filled, it is able to operate the glow discharge and the glow-arc transition with a lower power, since it is operated with comparatively low lamp current and lamp voltage at the glow discharge operation time, as shown by a dotted line. Therefore, the sputtering of electrode materials in the high intensity discharge lamp 8 can be suppressed.

On the other hand, in the high-intensity discharge lamp in which a neon-argon mixed gas (Ne—Ar) is filled, the voltage to the current is high, as shown by a pint P2 in FIG. 16B. Accordingly, if the output is excessively reduced, the glow discharge is not maintained.

In such a high-intensity discharge lamp in which a neon-argon mixed gas (Ne—Ar) is filled, it requires an output curve, as shown in a broken line D2. Therefore, in the high-intensity discharge lamp in which a neon-argon mixed gas (Ne—Ar) is filled, it does not need the output reducing means. So that, the high-intensity discharge lamp lighting apparatus of the first embodiment, as shown in FIG. 1 is suitable such a high-intensity discharge lamp. Here, since a neon-argon mixed gas is used for the high-intensity discharge lamp, it has less sputtering caused by a lamp current at the glow discharge operation.

According to the first embodiment of the high-intensity discharge lamp lighting apparatus, the electronic ballast is able to be operated with the resonance frequency of the LC resonance circuit in the main circuit at a no-load state. It is also able to increase the secondary open voltage through the glow discharge operation. Thus it is able to keep the high secondary voltage at the time of glow-arc transition.

According to the second embodiment of the high-intensity discharge lamp lighting apparatus, a high-intensity discharge lamp starts the glow discharge operation in short time by being applied a high voltage for causing the electrical breakdown before lighting. Thus it has less stress to the circuit even when the inductors saturate. On the other hand, for avoiding saturation of inductors at the start of arc discharge, it is able to prevent to stress to the circuit even when a comparatively high voltage is kept during the time required for the glow-arc transition.

According to the third embodiment of the high-intensity discharge lamp lighting apparatus, the frequency of the high-intensity discharge lamp at the start of glow discharge, the frequency in the glow discharge operation, and the frequency at the glow-arc transition time coincide with the no-load resonance frequency of the LC resonance circuit. Thus, these frequencies are easily controlled.

According to the fourth embodiment of the high-intensity discharge lamp lighting apparatus, the electronic ballast is effectively operated in a lagging phase at the frequency which is higher than the resonance frequency at the no-load state, while its output voltage lowers.

According to the fifth embodiment of the high-intensity discharge lamp, the operating frequency shifts to the frequency band which is free from the acoustic resonance when the acoustic resonance occurs. Thus, it is easy to avoid the acoustic resonance.

According to the sixth embodiment of the high-intensity discharge lamp lighting apparatus, the operating frequency shifts into either frequency band which is free from acoustic resonance when an acoustic resonance occurs. Thus, it is easy to avoid the acoustic resonance.

According to the seventh embodiment of the high-intensity discharge lamp lighting apparatus, when it does not start the glow discharge the lighting operation is reset. So that, it is able to repeat the operation for lighting the discharge lamp from the beginning.

According to the eighth embodiment, the luminaire is provided with a lighting equipment main body whereon the high-intensity discharge lamp lighted up in the high-intensity discharge lamp lighting apparatus of either the first or the seventh embodiment is mounted. Thus, the luminaire is able to have the effects obtained in the first through the seventh embodiments of the present invention.

While there have been illustrated and described what are at present considered to be preferred embodiments of the present invention, it will be understood by those skilled in the art that various changes and modifications may be made, and equivalents may be substituted for elements thereof without departing from the true scope of the present invention. In addition, many modifications may be made to adapt a particular situation or material to the teaching of the present invention without departing from the central scope thereof. Therefore, it is intended that the present invention not be limited to the particular embodiment disclosed as the best mode contemplated for carrying out the present invention, but that the present invention includes all embodiments falling within the scope of the appended claims.

The foregoing description and the drawings are regarded by the applicant as including a variety of individually inventive concepts, some of which may lie partially or wholly outside the scope of some or all of the following claims. The fact that the applicant has chosen at the time of filing of the present application to restrict the claimed scope of protection in accordance with the following claims is not to be taken as a disclaimer or alternative inventive concepts that are included in the contents of the application and could be defined by claims differing in scope from the following claims, which different claims may be adopted subsequently during prosecution, for example, for the purposes of a divisional application.

What is claimed is:

1. A high-intensity discharge lamp lighting apparatus comprising:
    a main circuit, which contains an LC oscillation circuit, and to which a high-intensity discharge lamp is coupled; and
    an electronic ballast for starting up into a lighting state the high-intensity discharge lamp via the main circuit which is coupled to an output side of the electronic ballast, and the electronic ballast is operated at a no-load resonance frequency of the LC resonance circuit,
    wherein inductors of the LC resonance circuit saturate at start-up of a glow discharge of the high-intensity discharge lamp, but fail to saturate during glow discharge and arc discharge.

2. A high-intensity discharge lamp lighting apparatus as claimed in claim 1, wherein the frequency of the electronic ballast at the start of glow discharge of the high-intensity discharge lamp coincides with the no-load resonance frequency of the LC resonance circuit under the state that the inductors saturate, and the frequency of the electronic ballast during glow discharge of the high-intensity discharge lamp coincides with the a no-load resonance frequency of the LC resonance circuit under the state that the inductors fail to saturate.

3. A high-intensity discharge lamp lighting apparatus as claimed in claim 1, further comprising;
    a glow discharge detector for detecting glow discharge of the high-intensity discharge lamp; and
    an output reducing means for reducing an output voltage into a range in which glow discharge is maintained at the operating frequency of the electronic ballast which is higher than the no-load resonance frequency of the LC resonance circuit when the inductors fail to saturate after glow discharge is detected by the glow discharge detector.

4. A high-intensity discharge lamp lighting apparatus as claimed in claim 1,
    wherein the electronic ballast is operated to light the high-intensity discharge lamp at a frequency which is close to either end of a frequency band which is free from acoustic resonance of the high-intensity discharge lamp.

5. A high-intensity discharge lamp lighting apparatus as claimed in claim 4, further comprising: an acoustic resonance detector for detecting an acoustic resonance of the high-intensity discharge lamp, wherein, when the acoustic resonance is detected by the acoustic resonance detector, the operating frequency of the electronic ballast shifts to either frequency band which is free from acoustic resonance.

6. A high-intensity discharge lamp lighting apparatus as claimed in claim 1, further comprising a timer, and wherein the electronic ballast is reset to it's state at the start of operation when glow discharge is not detected within a predetermined interval of time measured by the timer.

7. A high-intensity discharge lamp lighting apparatus as claimed in claim 1, wherein the electronic ballast is operated to light the high-intensity discharge lamp at a frequency which is close to either end of a frequency band which is free from acoustic resonance of the high-intensity discharge lamp.

8. A high-intensity discharge lamp lighting apparatus as claims in claim 7, further comprising:

an acoustic resonance detector for detecting an acoustic resonance of the high-intensity discharge lamp, wherein, when the acoustic resonance is detected by the acoustic resonance detector, the operating frequency of the electronic ballast shifts to either frequency band which is free from acoustic resonance.

9. A high-intensity discharge lamp lighting apparatus as claimed in claim 2, wherein the electronic ballast is operated to light the high-intensity discharge lamp at a frequency which is close to either end of a frequency band which is free from acoustic resonance of the high-intensity discharge lamp.

10. A high-intensity discharge lamp lighting apparatus as claims in claim 9, further comprising:

an acoustic resonance detector for detecting an acoustic resonance of the high-intensity discharge lamp, wherein, when the acoustic resonance is detected by the acoustic resonance detector, the operating frequency of the electronic ballast shifts to either frequency band which is free from acoustic resonance.

11. A high-intensity discharge lamp lighting apparatus as claimed in claim 3, wherein the electronic ballast is operated to light the high-intensity discharge lamp at a frequency which is close to either end of a frequency band which is free from acoustic resonance of the high-intensity discharge lamp.

12. A high-intensity discharge lamp lighting apparatus as claims in claim 10, further comprising:

an acoustic resonance detector for detecting an acoustic resonance of the high-intensity discharge lamp, wherein, when the acoustic resonance is detected by the acoustic resonance detector, the operating frequency of the electronic ballast shifts to either frequency band which is free from acoustic resonance.

13. A high-intensity discharge lamp lighting apparatus as claimed in claim 1, further comprising:

a timer, and wherein the electronic ballast is reset to it's state at the start of operation when glow discharge is not detected within a predetermined interval of time measured by the timer.

14. A high-intensity discharge lamp lighting apparatus as claimed in claim 2, further comprising:

a timer, and wherein the electronic ballast is reset to it's state of the start of operation when glow discharge is not detected during a predetermined interval of time measured by the timer.

15. A high-intensity discharge lamp lighting apparatus as claimed in claim 3, further comprising:

a timer, and wherein the electronic ballast is reset to it's state of the start of operation when glow discharge is not detected within a predetermined interval of time measured by the timer.

16. A high-intensity discharge lamp lighting apparatus as claimed in claim 4, further comprising:

a timer, and wherein the electronic ballast is reset to it's state of the start of operation when glow discharge is not detected within a predetermined interval of time measured by the timer.

17. A high-intensity discharge lamp lighting apparatus as claimed in claim 5, further comprising:

a timer, and wherein the electronic ballast is reset to it's state of the start of operation when glow discharge is not detected within a predetermined interval of time measured by the timer.

18. A luminaire, comprising:

a high-intensity discharge lamp lighting apparatus as claimed in claim 1; and a main body in which the high-intensity discharge lamp to be lighted up by the high-intensity discharge lamp lighting apparatus is amounted.

19. A luminaire, comprising:

a high-intensity discharge lamp lighting apparatus as claimed in claim 2; and a main body in which the high-intensity discharge lamp to be lighted up by the high-intensity discharge lamp lighting apparatus is amounted.

20. A luminaire, comprising:

a high-intensity discharge lamp lighting apparatus as claimed in claim 3; and a main body in which the high-intensity discharge lamp to be lighted up by the high-intensity discharge lamp lighting apparatus is amounted.

21. A luminaire, comprising:

a high-intensity discharge lamp lighting apparatus as claimed in claim 4; and a main body in which the high-intensity discharge lamp to be lighted up by the high-intensity discharge lamp lighting apparatus is amounted.

22. A luminaire, comprising:

a high-intensity discharge lamp lighting apparatus as claimed in claim 5; and a main body in which the high-intensity discharge lamp to be lighted up by the high-intensity discharge lamp lighting apparatus is amounted.

23. A luminaire, comprising:

a high-intensity discharge lamp lighting apparatus as claimed in claim 6; and a main body in which the high-intensity discharge lamp to be lighted up by the high-intensity discharge lamp lighting apparatus is amounted.

* * * * *